(12) United States Patent
Tajima et al.

(10) Patent No.: US 8,506,904 B2
(45) Date of Patent: *Aug. 13, 2013

(54) SAMPLE ARRAYING/ASSEMBLING DEVICE, ITS METHOD, AND APPARATUS USING SAMPLE ASSEMBLY

(75) Inventors: Hideji Tajima, Matsudo (JP); Yukiko Miyashita, Matsudo (JP); Osamu Segawa, Matsudo (JP)

(73) Assignee: Universal Bio Research Co., Ltd., Matsudo-Shi, Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,879

(22) Filed: Oct. 4, 2011

(65) Prior Publication Data

US 2012/0053090 A1    Mar. 1, 2012

Related U.S. Application Data

(63) Continuation of application No. 10/561,550, filed as application No. PCT/JP2004/009053 on Jun. 21, 2004, now Pat. No. 8,034,303.

(30) Foreign Application Priority Data

Jun. 20, 2003   (JP) ................................. 2003-177228

(51) Int. Cl.
    *B01L 3/00*    (2006.01)
    *B01L 99/00*   (2010.01)
    *C12M 1/34*    (2006.01)
    *C12M 3/00*    (2006.01)

(52) U.S. Cl.
    USPC ..................................... 422/500; 435/287.1

(58) Field of Classification Search
    USPC ......................................................... 422/500
    See application file for complete search history.

(56) References Cited

U.S. PATENT DOCUMENTS

| | | |
|---|---|---|
| 5,744,305 A | 4/1998 | Fodor et al. |
| 5,807,522 A | 9/1998 | Brown et al. |

(Continued)

FOREIGN PATENT DOCUMENTS

| | | |
|---|---|---|
| JP | 11-187900 | 7/1999 |
| JP | 2001-99847 A | 4/2001 |
| JP | 2002-286727 A | 10/2002 |
| JP | 2002-540380 A | 11/2002 |
| JP | 2003-107083 A | 4/2003 |

(Continued)

OTHER PUBLICATIONS

"Decagonal prism" online article, 2010.

*Primary Examiner* — Sam P Siefke
*Assistant Examiner* — Bryan Kilpatrick
(74) *Attorney, Agent, or Firm* — Haynes and Boone, LLP

(57) ABSTRACT

The present invention relates to a sample arraying/assembling device, its method, and an apparatus using a sample assembly, and has an object of providing a sample arraying/assembling device which is adapted to various microplates, and is capable of efficiently and quickly arraying and assembling various samples; its method; and an apparatus using a sample assembly.

The present invention includes: a distributing section which is capable of holding respective solutions containing samples to be distributed, and which has a plurality of holding ends arranged in a predetermined matrix; and a wound body which has a plane surface wound with a slender foundation member on which samples are to be distributed at distribution intervals of column or line of the matrix, which is arranged in parallel at the winding intervals of the line or column on the plane surface, so that the respective holding ends can come into contact therewith.

2 Claims, 14 Drawing Sheets

(56) References Cited

U.S. PATENT DOCUMENTS

| | | | |
|---|---|---|---|
| 5,895,631 A * | 4/1999 | Tajima | 422/513 |
| 6,040,193 A | 3/2000 | Winkler et al. | |
| 6,221,653 B1 | 4/2001 | Caren et al. | |
| 8,034,303 B2 * | 10/2011 | Tajima et al. | 422/500 |
| 2001/0046699 A1 * | 11/2001 | Tajima | 435/287.1 |
| 2007/0178580 A1 | 8/2007 | Tajima et al. | |

FOREIGN PATENT DOCUMENTS

| | | |
|---|---|---|
| JP | 2004-93558 A | 3/2004 |
| WO | WO 01/53831 | 7/2001 |
| WO | WO 01/61361 | 8/2001 |
| WO | WO 01/69249 | 9/2001 |
| WO | WO 02/063300 | 8/2002 |
| WO | WO 03/100421 | 12/2003 |

* cited by examiner (a)

(b)

(a)

181

(b)

SAMPLE ARRAYING/ASSEMBLING DEVICE, ITS METHOD, AND APPARATUS USING SAMPLE ASSEMBLY

CROSS REFERENCE TO RELATED APPLICATIONS

This application is a Continuation of U.S. patent application Ser. No. 10/561,550, filed Jun. 21, 2004, which is a U.S. National Phase Application of International Application No. PCT/JP2004/009053, filed Jun. 21, 2004, which claims priority to Japanese Patent Application No. 2003-177228, filed Jun. 20, 2003.

TECHNICAL FIELD

The present invention relates to a sample arraying/assembling device, its method, and an apparatus using a sample assembly. More precisely, the invention relates to a device which arrays various samples on the surface of a three-dimensional body such as a cylinder, its method, and an apparatus using a sample assembly. The present invention is used for manufacturing a three-dimensional array such as in a cylindrical shape where samples containing various biological materials such as nucleic acids, polynucleotides, oligonucleotides, proteins, saccharides, and immunity substances are arrayed. The present invention is useful in fields where examination or processing using such arrayed various samples is required, in particular, such fields as chemistry including biochemistry, medicine, health, pharmacology, food industry, agriculture, livestock industry, fisheries, engineering, and the like.

BACKGROUND ART

Conventionally, a planar array where biological materials such as thousands of various different gene specimens or various oligonucleotides are arrayed on a plane, has come to be often used in examination and testing (Published Japanese Translation No. 10-503341 of PCT International Publication, U.S. Pat. No. 5,807,522, Japanese Unexamined Patent Publication No. Hei 11-187900, U.S. Pat. No. 6,221,653, U.S. Pat. No. 5,744,305). For example, in order to determine the unknown base sequence of a target biological material: a planar array having various oligonucleotides arrayed is prepared; DNA segments of the target biological material are labeled with a fluorescent substance or the like; the position of the detected fluorescent luminescence on the planar array bonded with the DNA segment is determined; and the structure of the base sequence of the target biological material is determined by the detection position. Arraying the samples such as oligonucleotides and the like on this planar array, is performed for example by drawing a small amount of the solution from a container storing a solution suspended with the samples such as the specimen, and transferring to corresponding spotting positions on a plane, and contacting the liquid onto the surface one by one (U.S. Pat. No. 6,040,193).

On the other hand, as a substitute for the planar array, the present inventor has developed a sample assembly having a foundation member formed into a slender shape such as thread-like or string-like shape, and with samples containing various biological materials immobilized along the longitudinal direction of the foundation member, wherein the foundation member is wound, and the various biological materials and their immobilized positions are associated (WO01/61361 A1, WO01/53831 A1, WO01/69249 A1, WO02/63300 A1). In order to arrange the biological materials onto the thread-like or string-like foundation member, for example, the string-like foundation member is arranged or made travel along a predetermined route, while from the container storing the solution suspended with the samples such as a specimen, a small amount of solution is arranged in the corresponding positions (International Application No. PCT/JP03/06618).

Incidentally, the solution containing the various samples for spotting is normally stored in an International Standard 96-well microplate (9 mm pitch), 384-well microplate (4.5 mm pitch), or 1536-well microplate (2.25 mm pitch). The various samples are arrayed and assembled by sequentially repeating an operation of inserting pins into these respective wells to adhere the stored solution, and transferring the samples onto a glass plate to be arrayed, so that the tips of pin-like application sections are in contact with predetermined positions having a smaller pitch than the pitch between the respective wells.

In order to array the samples for this purpose, it is necessary to repeat the transfer with respect to the pins and the glass plate, so that there is a problem of taking time and labor especially if the operation is manually performed.

Moreover, in order to array the samples in the assembled condition, it is necessary to reduce the distribution amount of the samples in the respective positions, and a sufficient amount of the samples can not be arrayed, so that there a problem of a likelihood of worsening the reaction efficiency.

Furthermore, to perform the processing in the respective spotting positions in the assembled condition, there is a problem of difficulty in handling, and the likelihood of not being able to obtain sufficient accuracy.

On the other hand, in order to manufacture the sample assembly, distribution of the samples onto the string-like foundation member constituting the sample assembly by means of the pin-like application sections, requires fixing the arranged string-like foundation member and moving the application sections, or fixing the application sections and making the string-like foundation member travel, thus requiring a complicated mechanism. Moreover, in order to make the string-like member distributed with the samples travel, it is necessary to bridge the string-like member over a mechanism such as a roller. Therefore there is a problem of the likelihood of requiring a complicated mechanism in order to avoid cross contamination of the samples distributed on the respective spotting points.

To array the samples only on one flat face of a glass plate and the like, there is a problem of low usage efficiency due to the existence of the reverse face that is not used.

Furthermore, to use a complicated and large-scale apparatus, there is a problem of the likelihood of high manufacturing cost and operating cost.

Therefore, the present invention is made to solve the above problems, with a first object of providing: a sample arraying/assembling device which is adapted for various microplates of the International Standard, and is capable of arraying a large number of samples onto a string-like or thread-like foundation member or the like, at once or intermittently quickly, thereby enabling efficient and quick processing; its method; and an apparatus using a sample assembly.

A second object is to provide a sample arraying/assembling device which arrays and assembles the samples in a three-dimensional shape, thus enabling an increase in usage efficiency; its method; and an apparatus using a sample assembly.

A third object is to provide a reliable sample arraying/assembling device which can reliably prevent cross contamination between respective arrayed samples; its method; and an apparatus using a sample assembly.

A fourth object is to provide a sample arraying/assembling device which can array various samples in various three-dimensional shapes, with variety and generality; its method; and an apparatus using a sample assembly.

A fifth object is to provide a sample arraying/assembling device which is easy to use and low in cost, that can be readily used in a laboratory and the like, having a simple structure capable of arraying and assembling samples by simple handwork at low cost; its method; and an apparatus using a sample assembly.

A sixth object is to provide a sample arraying/assembling device which is capable of reliably associating the respective samples and the positions thereof, by arraying the samples one-dimensionally so that the samples can be reliably arrayed and assembled; its method; and an apparatus using a sample assembly.

A seventh object is to provide a sample arraying/assembling device which can distribute a sufficient amount of liquid into respective sample distribution positions, and can array and assemble the samples so as to increase the reaction efficiency; its method; and an apparatus using a sample assembly.

An eighth object is to provide a sample arraying/assembling device which uses a sample assembly having various samples assembled and arrayed so that optical information can be obtained readily at low cost; its method; and an apparatus using a sample assembly.

DISCLOSURE OF THE INVENTION

In order to solve the above technical problems, a first aspect of the present invention is a sample arraying/assembling device comprising: a distributing section which is capable of holding respective solutions containing samples to be distributed, and which has a plurality of holding ends arranged in a predetermined matrix; and a wound body which has a plane surface wound with a string-like or thread-like slender foundation member on which samples are to be distributed at distribution intervals of column or line of the matrix, which is arranged in parallel at winding intervals of the line or column on the plane surface, so that the respective holding ends can come into contact therewith.

Here, the "predetermined matrix" means a condition where respective components, such as wells in a container, concavities and convex portions on the wound body, or holding ends of the distributing section, are arranged in parallel at respectively determined intervals with respect to two directions of the column direction and the line direction. The column direction and the line direction are normally orthogonal, however the predetermined matrix is not limited to this. For example, for the microplate-like container it means a condition of arrangement of a plurality of wells at previously determined intervals. Preferred examples include an International Standard 48-well microplate (6 columns×8 lines), 96-well microplate (8 columns×12 lines), 384-well microplate (16 columns×24 lines), and 1536-well microplate (32 columns×48 lines). The "distribution intervals" and "winding intervals" respectively mean intervals matching the column intervals or the line intervals of the predetermined matrix, which are preferably uniform. Moreover, the "distribution intervals" and the "winding intervals" may be the same or different.

Examples of the "sample" include biological materials such as nucleic acids, polynucleotides, oligonucleotides, proteins, saccharides, immunity substances, biopolymers such as hormones, and low molecular weight biosubstances. Moreover, the sample includes beads adhered with these biological materials.

The "holding end" is an end of a member which has a function of holding a small amount of liquid of the various samples. For example, in order to broaden the contact area of the holding end and the foundation member, grooves or concavities along the foundation member are preferably provided on the tip. Moreover, the holding end capacity can be increased by providing a pen tip-like slit or a hole on the tip portion, or by forming into an approximate letter-J shape, an approximate letter-V shape, or an approximate letter <shape. Moreover, the holding end may have a material with water bearing properties such as a porous material, a corrugated material, or a foaming material at the tip or all over. Furthermore, the holding end may be cylindrical, tubular, or donut shape, and may be hollow inside. The material of the holding end is formed for example from, a plastic such as polycarbonate, polyvinyl acetate, polyethylene, polypropylene, polysulphone, polyvinylidene 2 fluoride, and teflon (registered trademark), a non-metal such as a glass, or a metal such as aluminium, titanium, and the like. Moreover, in order to prevent the solution from being adhered onto the region adjacent to the holding end instead of the holding end, the surface is preferably coated with a polymer, in particular teflon (registered trademark) or silicone to give a hydrophobic property.

The holding ends are preferably distributed so that the whole periphery of the foundation member is in contact with the samples in the respective distribution positions.

The "distributing section" may be disposable, or may be reusable by washing.

The "foundation member" is the object of distribution of the solution containing the various samples, and is wound through a side face of a cylindrical or a prism shaped (including solid or hollow) core to form a sample assembly. The foundation member is formed from a string-like or thread-like flexible material so that it can be wound and unwound. Moreover, the length of the foundation member has a length allowing distribution of at least samples corresponding to all the elements of the matrix. The thickness of the foundation member is within a range between about 10 μm and several mm. In order to array the samples contained in the distributed solution, it is necessary that the foundation member itself has water bearing properties such as porosity, corrugations, or foam, or has been surface treated by coating, soaking, or the like. The material thereof is preferably determined by the samples to be distributed. Examples include nylon treated with HCl or formic acid, cellulose, nitrocellulose, a glass fiber, cellulose, chitosan, epoxy resin or monofilament carriers, and silk threads or cotton threads entwined with fibers. In the foundation member, biologically activated molecules are preferably fixed onto the porous layer and the like. Such functional groups (molecules) include —$NH_2$, —COOH, groups aminated by a nucleophile, and so on. The sample distributed onto the foundation member is preferably fixed by drying, UV crosslinking, a PVA cross-linking method, a UV cross-linked resin method, and the like according to the property of the sample.

In order to enable the foundation member to contact with all holding ends, the length of the foundation member on the plane needs to have at least the length from the end of the column or the line of the matrix to the end, and the number of windings needs to be the number of the lines or the columns. The respective samples to be distributed, and the positions on the foundation member where the respective samples are to be distributed, are previously determined.

The "wound body" means a three-dimensional body around which the foundation member is wound. The shape thereof includes a planar shape and a prism shape. The wound body needs to be provided with at least one plane, or two planes to several planes where the distribution is to be performed. The winding route of the wound body is preferably set in parallel with the line or the column of the predetermined matrix of the distributing section or the like. The wound body preferably has a rotationally symmetric axis, and is wound around the rotationally symmetric axis so as to be orthogonal or approximately orthogonal to the axis.

The material of the wound body is for example a plastic such as polyacetal resin, polypropylene, and polyethylene, a non-metal such as a glass, a metal such as aluminium, titanium, or the like.

According to the first aspect of the present invention, the holding ends of the distributing section are arranged on a matrix such as wells arranged in an already-known microplate, and the foundation member is wound around the wound body to match to the arrangement of the holding ends. Consequently, using the already-known microplate, the samples can be distributed efficiently at once. Moreover, the samples are not directly distributed on the wound body, but are distributed on the foundation member wound around the wound body. Consequently, the distribution position of the sample is fixed not on the wound body but on the foundation member. Therefore the assembling can be readily performed by assembling the array of the foundation member. According to the present invention, since the samples are distributed on the foundation member which is not assembled, the samples can be readily distributed, and the assembling can be readily performed by arraying the foundation member on which the samples are distributed, in a condition where the winding intervals are narrowed and dense.

A second aspect of the present invention is a sample arraying/assembling device comprising a container which has a plurality of wells capable of storing the respective solutions containing the samples to be distributed, arrayed in the predetermined matrix, and the respective holding ends of the distributing section are provided so as to be able to be inserted into the respective wells. Here, the "container" is for example the abovementioned microplate. The respective holding ends of the distributing section need to have a length and a thickness allowing them to be inserted into the respective wells.

According to the second aspect of the present invention, using an already-known microplate, the distribution processing of the samples can be performed readily and efficiently at low cost.

A third aspect of the present invention is a sample arraying/assembling device wherein the distributing section has liquid storing sections capable of storing the respective solutions containing the samples to be distributed, arrayed in the predetermined matrix, and the holding ends are respectively communicated with the liquid storing sections.

Here, since the holding ends are communicated with the liquid storing sections, the holding ends need to be for example, a tubular or pen-like shape, or to have a water bearing material.

According to the third aspect of the present invention, the distributing section supplies the solution from the inside of the holding ends to the holding ends, by means of the liquid storing sections capable of storing the respective solutions containing the samples to be distributed, and which is communicated therewith. Consequently, a container for merely storing the solution can be omitted, or a step for drawing out of the respective containers from inside the containers by the holding ends can be omitted. Moreover, a large amount the same sample can be continually distributed. Consequently, the working space and the working process can be omitted for that amount. Furthermore, since a large amount of the sample can be distributed, the efficiency is high and the processing can be quickly performed.

A fourth aspect of the present invention is a sample arraying/assembling device wherein the wound body has a plate body and the plane surface is a plate face. Here, preferably the plate body has a square plate face corresponding to the arrangement of the holding ends of the distributing section, the arrangement of the respective wells of the container, or the size of the matrix.

According to the fourth aspect of the present invention, the foundation member is wound around the plate body as the wound body. Consequently, the samples can be distributed on the top face and the reverse face, and hence the working efficiency is high.

A fifth aspect of the present invention is a sample arraying/assembling device wherein the wound body has a prism, and the plane surface is a side face. Here, preferably the prism has a square side face corresponding to the arrangement of the holding ends of the distributing section, the arrangement of the respective wells of the container, or the size of the matrix. Since it is a prism, it is possible to have at least three planes.

According to the fifth aspect of the present invention, the foundation member is wound around the prism as the wound body. Consequently, since at least three planes or more can be used, the usage efficiency is high.

A sixth aspect of the present invention is a sample arraying/assembling device wherein the distributing section has a plurality of holding ends projecting to the bottom side of a rectangular board, and arranged in the predetermined matrix. Here, "rectangular" is a shape corresponding to the predetermined matrix.

According to the sixth aspect of the present invention, since a plurality of holding ends are arranged in a matrix on one board, the distribution processing can be readily performed at once by a unit matrix.

A seventh aspect of the present invention is a sample arraying/assembling device wherein the holding ends have a water bearing property. Here, in order to "have a water bearing property", for example, the tip of the holding end is provided with a slit, or is formed into a tubular shape, or is formed from a material with a water bearing property such as a porous or a form material.

According to the seventh aspect of the present invention, the capacity of holding the solution can be increased, by making the holding end have a water bearing property.

An eighth aspect of the present invention is a sample arraying/assembling device wherein the surface of the wound body is provided with a localization section which localizes the samples within a fixed range on the foundation member, in distribution positions of the respective samples provided at distribution intervals of the column or line along a winding route of the foundation member which has been provided in parallel at winding intervals of the line or column of the predetermined matrix.

Here, since it is "within a fixed range of the foundation member" adhering of the samples at least onto parts other than the localization member of the wound body can be prevented.

According to the eighth aspect of the present invention, the surface of the wound body is provided with a localization section which localizes the distributed samples to within a fixed range of the foundation member. Consequently, the samples can be kept from spreading outside of a fixed range of the foundation member, onto the foundation member or the surface of the wound body, thus preventing cross contamination. Therefore the samples can be distributed with a high reliability.

A ninth aspect of the present invention is a sample arraying/assembling device wherein the localization sections are concavities at distribution intervals of the column or line, along the winding route of the foundation member that has been provided in parallel at the winding intervals of the line or column of the predetermined matrix, and the foundation member is in contact with the holding ends in the concavities. In this case, the concavities are arranged in the predetermined matrix overall.

According to the ninth aspect of the present invention, the concavities are provided as the localization sections. As a result, in addition to the abovementioned effect, the samples supplied from the holding ends can be made to contact with the entire periphery of the foundation member. Moreover, the samples can be prevented from flowing out to the adjacent distribution positions, thus preventing cross contamination.

A tenth aspect of the present invention is a sample arraying/assembling device wherein the localization sections are convex portions provided at distribution intervals of the column or line, along the winding route of the foundation member that has been provided in parallel at the winding intervals of the line or column of the predetermined matrix.

Here, there are cases where the contact of the foundation member with the holding ends is performed in the convex portions, and cases where this contact is performed in portions other than the convex portions, for example in the middle between the convex portions. The convex portions are arranged in the predetermined matrix overall.

In the case where the contact is performed in the convex portion, if the tip of the convex portion is sharpened, areas of the respective distribution regions of the samples can be reduced. Therefore cross contamination can be prevented effectively.

According to the tenth aspect of the present invention, the convex portions are provided as the localization sections. If pressure is applied by the holding ends so as to push the foundation member, the solution held by the holding ends can be soaked into the foundation member just within a small range at the tip of the convex portions. Consequently, the tip of the convex portion is preferably sharp. Moreover, if the holding end is tubular, or the tip of the holding end is formed into a donut shape, having a hole for holding the solution, then by providing the convex portion in a donut shape to match the shape and the size of the holding end, the foundation member is sandwiched by the holding end and the convex portion, thus preventing the solution held in the hole of the donut from leaking to the outside, and preventing cross contamination. Therefore the samples can be distributed with high reliability.

Moreover, if the holding ends are made to contact at the middle between the convex portions, since the foundation member is supported by the convex portions, the foundation member and the surface of the wound body are not directly in contact, and the samples can be distributed to the foundation member only, thus avoiding adhesion of the samples onto the surface of the wound body. Consequently, cross contamination can be prevented.

An eleventh aspect of the present invention is a sample arraying/assembling device wherein the surface of the wound body is formed with striations for guiding the foundation member along the winding route of the foundation member.

According to the eleventh aspect of the present invention, the foundation member can be wound to correspond to the position of the holding ends or the like of the distributing section. Therefore reliable distribution can be performed.

A twelfth aspect of the present invention is a sample arraying/assembling device, comprising: a base which detachably attaches the container and/or the wound body solely or in laminations in this order; and a movable section which is detachably attached with the distributing section above the base, and which can move the distributing section vertically so that it can be in contact with or separated from the container and/or the wound body. Here, it is necessary to position the wells of the respective containers, the foundation member wound around the wound body, and the respective holding ends of the distributing section so that they can be reliably contacted, by the movement.

According to the twelfth aspect of the present invention, the samples can be distributed onto the foundation member, readily and simply with high reliability.

A thirteenth aspect of the present invention is a sample arraying/assembling device, comprising: a detachably provided wound body which is wound with a foundation member on which samples are distributed at distribution intervals of column or line of a predetermined matrix, in parallel at winding intervals of the line or column; a detachably provided core to which one end of the foundation member is attached, and which is to be wound with the foundation member; and a foundation member rolling section which sequentially takes out the foundation member from the wound body while rolling it up around the core at narrower intervals than the winding intervals; so as to assemble and arrange the foundation member.

Here, "assembling of the foundation member" can be achieved by shortening the winding intervals. Preferably taking out of the foundation member is performed for each line or each column of the foundation member wound around the wound body. At this time, preferably this is performed by applying a tension to the foundation member. Moreover, preferably sequentially taking out the foundation member from the wound body, is performed for each line or each column wound and formed on the plane.

Here, the "core" is formed for example from, a plastic such as polycarbonate, polyvinyl acetate, polyethylene, and polypropylene, a non-metal such as a glass, or a metal such as aluminum, titanium, and the like.

According to the thirteenth aspect of the present invention, the foundation member is sequentially taken out from the wound body while it is being rolled up around the core at narrower intervals than the winding intervals. Consequently, there is no occurrence of abrasion due to friction between the wound body and the portion of the foundation member where the samples are actually distributed, and hence cross contamination between the samples distributed on the foundation member can be prevented, and the samples can be assembled with a high reliability. As a result, due to the broader winding intervals and distribution intervals of the wells arranged in the container or the holding ends arranged on the distributing section, the samples can be readily distributed, and also, thereafter, by assembling the foundation member narrower than the winding intervals, the samples can be readily and simply assembled.

A fourteenth aspect of the present invention is a sample arraying/assembling device wherein the foundation member rolling section rotates at least one of the wound body and the core, and relatively revolves said wound body and said core about each other, and relatively translationally moves them, so as to sequentially take out the foundation member from the wound body, and to roll up the foundation member that has been taken out, around the core.

Since it "rotates at least one of the wound body and the core, and relatively revolves said wound body and said core about each other", the case where the wound body and the core each simply just rotate is omitted, and it accompanies the revolution of one of them at least.

The direction, the axial direction, and the rotation speed ratio of the "revolution" and the "rotation" are set so that the foundation member can be taken out from the wound body and rolled up around the core.

According to the fourteenth aspect of the present invention, by a combination of simple operations of; revolution between the wound body and the core, rotation, and translational movement, the assembling can be readily performed reliably without cross contamination. Moreover, according to the present invention, since the foundation member can be assembled manually without using a motor, the scale of the device can be reduced and the assembling can be performed readily.

A fifteenth aspect of the present invention is a sample arraying/assembling device, comprising a core rotating and moving section which makes the foundation member rolling section rotate the core in the direction of rolling up the foundation member, and revolve around the wound body in the direction of taking out the foundation member, and translationally moves the core relatively with respect to the wound body, to thereby roll up the foundation member around the core. In general, since the core around which the foundation member is rolled up, is smaller compared to the wound body, the scale of the device can be reduced more if the core is revolved.

According to the fifteenth aspect of the present invention, a similar effect can be demonstrated to the effect described in the fourteenth aspect of the present invention.

A sixteenth aspect of the present invention is a sample arraying/assembling device wherein the wound body is swingably held. Here, preferably the swing axis is provided along the orthogonal direction to the winding direction. By providing the rotation axis and the revolution axis of the core in parallel with the swing axis, the mechanism can be simplified and the processing can be performed smoothly.

According to the sixteenth aspect of the present invention, the tension applied to the foundation member can be adjusted by swingably holding the wound body. Therefore the foundation member can be smoothly taken out from the wound body and rolled up around the core.

A seventeenth aspect of the present invention is a sample arraying/assembling device comprising: a distributing section which is capable of holding respective solutions containing samples to be distributed, and which has a plurality of holding ends arranged in a predetermined matrix; a wound body which has a plane surface wound with a string-like or thread-like slender foundation member on which samples are to be distributed at distribution intervals of column or line of the matrix, which is arranged in parallel at the winding intervals of the line or column on the plane surface, so that the respective holding ends can come into contact therewith; a detachably provided core to which one end of the foundation member is attached, and which is to be wound with the foundation member; and a foundation member rolling section which sequentially takes out the foundation member from the wound body while rolling it up around the core at narrower intervals than the winding intervals; so as to assemble and arrange the foundation member.

According to the seventeenth aspect of the present invention, the processing from the distribution of the sample onto the foundation member, to the assembling of the foundation member where the samples are distributed, can be readily performed by a simple device consistently. Since the assembling is performed after completing the sample distribution, the samples can be readily and reliably distributed.

An eighteenth aspect of the present invention is a sample arraying/assembling method of distributing samples at once at distribution intervals of column and line of a predetermined matrix, on a string-like or thread-like slender foundation member, comprising: a holding step for holding respective solutions containing samples to be distributed, on a plurality of holding ends arranged in a predetermined matrix; and a contact step for making the respective holding ends contact with the foundation member wound on a wound body having a plane surface wound so that the foundation member is arranged in parallel at winding intervals of the line or the column on the plane surface.

According to the eighteenth aspect of the present invention, a similar effect can be demonstrated to the effect described in the first aspect of the present invention.

An nineteenth aspect of the present invention is a sample arraying/assembling method, wherein the holding step is performed by inserting the holding ends into respective wells of a container having a plurality of wells arranged in the predetermined matrix, and storing solutions containing samples to be distributed.

According to the nineteenth aspect of the present invention, a similar effect can be demonstrated to the effect described in the second aspect of the present invention.

An twentieth aspect of the present invention is a sample arraying/assembling method, wherein the holding step comprises supplying the solution arranged in the predetermined matrix, and containing samples to be distributed, into a plurality of respective holding ends from the inside thereof.

According to the twentieth aspect of the present invention, a similar effect can be demonstrated to the effect described in the third aspect of the present invention.

A twenty first aspect of the present invention is a sample arraying/assembling method, comprising an assembling step for: sequentially taking out a foundation member from a wound body wound with a foundation member on which samples are distributed at distribution intervals of column or line of a predetermined matrix, in parallel at the winding intervals of the line or column; and rolling the foundation member up around a core to which one end of the foundation member is attached, and around which the foundation member is wound, at narrower intervals than the winding intervals.

According to the twenty first aspect of the present invention, a similar effect can be demonstrated to the effect described in the thirteenth aspect of the present invention.

A twenty second aspect of the present invention is a sample arraying/assembling method, wherein the assembling step comprises rotating at least one of the wound body and the core, and relatively revolving said wound body and said core about each other, and relatively translationally moving them, so as to sequentially take out the foundation member from the wound body, and to roll up the foundation member that has been taken out, around the core. Here, preferably a tension is applied when the foundation member is taken out from the wound body.

According to the twenty second aspect of the present invention, a similar effect can be demonstrated to the effect described in the fourteenth aspect of the present invention.

A twenty third aspect of the present invention is a sample arraying/assembling method comprising: a holding step for holding respective solutions containing samples to be distributed on a plurality of holding ends arranged in a predetermined matrix; a contact step for making the respective holding ends contact with the foundation member and the wound body having a plane surface wound so that the foundation member is arranged in parallel at winding intervals of line or column of the matrix on the plane surface; and an assembling step for sequentially taking out the foundation member from the wound body wound with a foundation member on which samples are distributed, in parallel at the winding intervals of the line or column, and rolling up the foundation member around a core to which one end of the foundation member is attached, and around which the foundation member is to be wound, at narrower intervals than the winding intervals.

According to the twenty third aspect of the present invention, a similar effect can be demonstrated to the effect described in the thirteenth aspect of the present invention and the seventeenth aspect of the present invention.

A twenty fourth aspect of the present invention is a wound body which has a string-like or thread-like slender foundation member on which samples are to be distributed at distribution intervals of the column or line, and a plane surface wound with the foundation member so as to be arranged in parallel at the winding intervals of the line or column on the plane surface. The wound body is preferably detachably provided with a supporting member such as a core to which one end of the foundation member is attached, and a rod which supports the core.

According to the twenty fourth aspect of the present invention, by mounting the foundation member around the wound body so as to match with the predetermined matrix, the distribution of the samples can be readily and reliably performed. Moreover, if the wound body has a plurality of plane surfaces, the samples can be distributed in the respective planes, and hence usage efficiency is high.

A twenty fifth aspect of the present invention is a sample arraying/assembling device, comprising: an assembled body having a core having a peripheral curved face or two side faces or more on which respective samples are to be distributed in predetermined positions with intervals, or wound or coated with a member on which respective samples are to be distributed in predetermined positions with intervals around the axis; and a rotating section which intermittently rotates the core around the axis for each predetermined angle so that the respective samples can be distributed around the peripheral curved face, the respective side faces, or the wound or coated member.

Here, the member may be a film-like member such as a membrane in addition to the string-like or the thread-like slender foundation member. The case where the distribution is performed by winding the core with the foundation member on which respective samples are to be arrayed, is a case where the wound body itself becomes the assembled body. The number of the side faces is for example six if the core is a hexagonal prism, and eight if it is an octagonal prism. Moreover, the "peripheral curved face" means a curved face such as a side face of a cylinder or an elliptic cylinder which forms the periphery of the three-dimensional figure.

The "assembled body" means a sample assembly before the samples are distributed.

"So that the respective samples can be distributed around the peripheral curved face, the respective side faces, or the wound or coated member" is preferably for example, to horizontally position the peripheral curved face or the respective side faces, if the solution containing the samples is distributed by a pipette tip or holding ends. An example thereof is a position where, if the core is cylindrical or prism like, the axis of the cylinder or the prism becomes horizontal. The axis may not necessarily be a rotationally symmetric axis. The rotating section may be rotatable manually or automatically.

The "predetermined angle" is determined according to the number and the shape of the side faces, for example 90 degrees if the prism is a regular tetrahedron. However the "predetermined angle" is not limited to this and may be determined according to for example an interval between the distributed adjacent spots.

Moreover, preferably on the peripheral curved face, the side faces, or the member of the core is provided in advance a stopping mark, a spotting piece, or a spotting concavity in the distribution position of the respective samples. As a result, the samples can be reliably and readily distributed. Moreover, since the distribution position of the samples can be accurately determined, the reliability of measurement can be improved.

According to the twenty fifth aspect of the present invention, by merely rotating the core for each predetermined angle by the rotating section, the respective samples can be intermittently, readily, and reliably distributed on the peripheral curved face of a cylinder or the like, the side faced of a prism or the like, or a member wound or coated.

A twenty sixth aspect of the present invention is an apparatus using a sample arraying/assembling device comprising: a sample assembly having a core having a peripheral curved face or two side faces or more on which respective samples are distributed in predetermined positions with intervals, or wound or coated with a member on which respective samples are distributed in predetermined positions with intervals around the axis; a translucent or semitranslucent pipette tip capable of storing the sample assembly and having a fluid drawing and discharging opening; a rotating section which intermittently rotates the pipette tip and the sample assembly stored in the pipette tip, around the axis of the pipette tip or the core for each predetermined angle; and an optical information acquisition section which receives light from the sample assembly and obtains optical information.

Here, the "member" includes a film-like member such as a membrane in addition to the string-like or the thread-like slender foundation member. The "pipette tip" is attachable to a nozzle which is connected to a pressure adjustment section for drawing a fluid into the pipette tip and discharging the fluid from the pipette tip. The sample assembly can be stored in a condition of being fixed to the inside of the pipette tip.

The rotation of the pipette tip around the axis by the rotating section is performed for example by using a positioning member having inside a bore through which the pipette tip is inserted, and which is formed with an outer face of a prism having the outside match the axis of the pipette tip, to intermittently rotate the pipette tip around the axis while positioning by the outer face of the positioning member. The pipette tip is attachable to a nozzle of a device which draws and discharges manually or electrically. The "rotating section" can be rotatable manually or automatically.

Moreover, in the optical information acquisition section, if the labeling is performed by fluorescent substances, exciting light is irradiated onto the sample assembly for each rotation of a predetermined angle by the rotating section, and the fluorescent light is received by a light receiver. The received light signal is converted into an electric signal, and the electric signal is processed by a controller, analyzed by a computer, and outputted to a display panel.

According to the twenty sixth aspect of the present invention, since the optical information is obtained by the intermittent rotation, the optical information can be readily obtained at low cost by simple handling such as by hand.

Moreover, according to the twenty sixth aspect of the present invention, when the optical information is measured, the sample assembly is stored in the pipette tip. Consequently, the measurement can be performed at the time of drawing the necessary reagents into the pipette tip and making them contact with the sample assembly to react. As a result, the luminescence immediately after the reaction can be reliably captured, and hence reliability is high.

BEST MODE FOR CARRYING OUT THE INVENTION

Hereunder is a description of a sample arraying/assembling device according to an embodiment of the present invention, with reference to the drawings. The description of the present embodiment should not be considered as limiting the present invention unless particularly specified.

Figure 1:
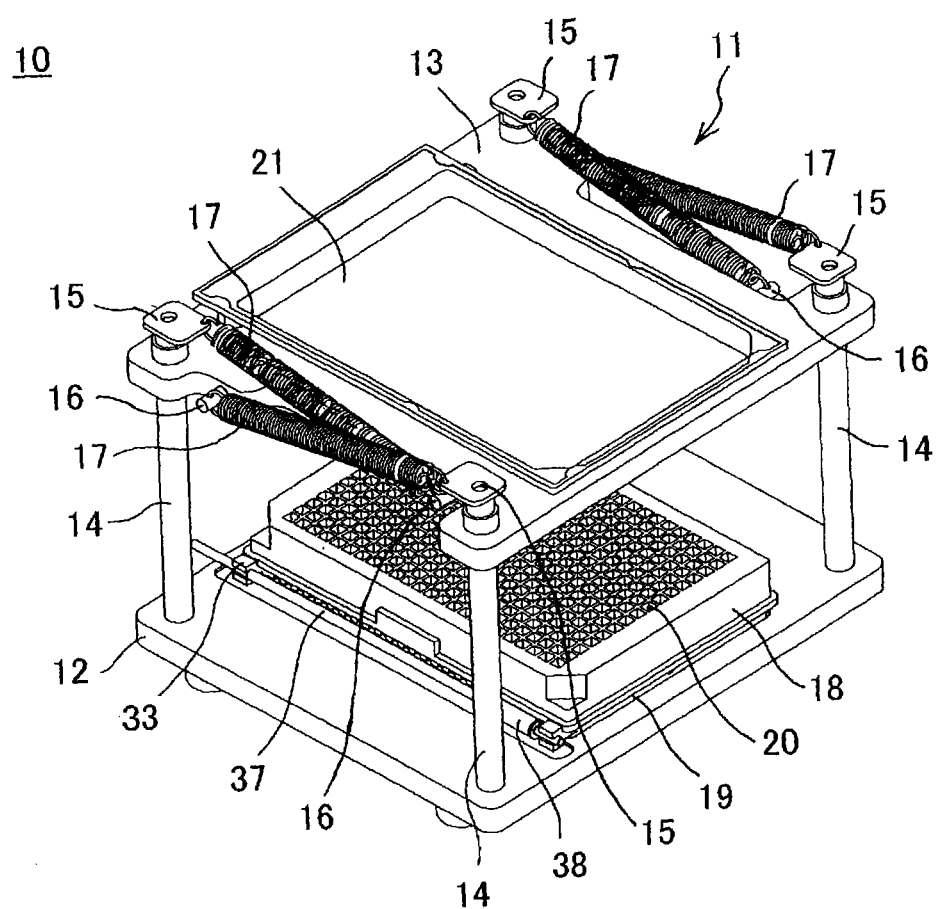
FIG. 1 is a perspective view of a sample distributing device according to an embodiment of the present invention.

FIG. 1 is a perspective view showing an example of a sample distributing device 11 in a sample arraying/assembling device 10 according to the present embodiment. The sample distributing device 11 has: a rectangular board shaped base 12 fixed at the bottom; a movable section 13 which moves vertically; and four guiding poles 14 the bottom ends of which are provided on the base 12, and which are projected upward to pierce the movable section 13 so as to guide the operation of the movable section 13. The movable section 13 is biased by four springs 17 so as to be positioned on the upper side of the guiding poles 14 in a normal condition where no force is applied by a user. The ends of the springs 17 are attached to top ends 15 that are respectively provided on the guiding poles 14, and the other ends thereof are attached to four projections 16 that are provided on the movable section 13.

On the base 12 is mounted a container 18 and a wound body 19 in stacked condition. In the container 18, a plurality of wells 20 are arranged in matrix form (in this example, a matrix of 16 columns×24 lines). The respective wells 20 store or are capable of storing various solutions containing samples to be distributed on a string-like or thread-like foundation member described later, at column distribution intervals of the matrix. The wound body 19 is wound by the foundation member at winding intervals of line corresponding to the matrix (the foundation member is not shown for the sake of clarity of the drawing).

The movable section 13 has a distributing section 21 on which a plurality of holding ends projecting downwards and having the function of holding the various solutions, are arranged in matrix form.

Figure 2:
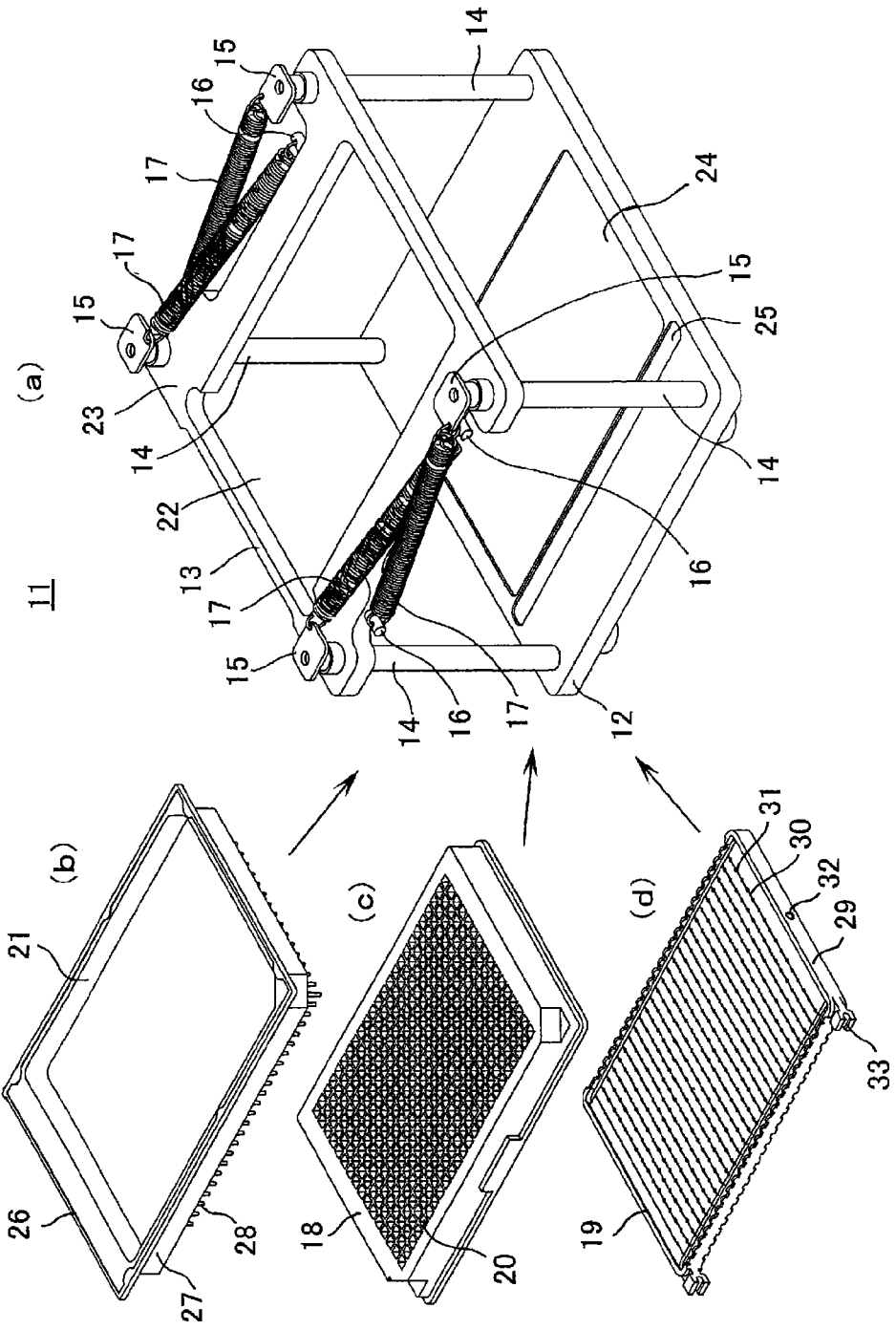
FIG. 2 is an exploded perspective view of the sample distributing device according to the embodiment of the present invention.

FIG. 2 shows the sample distributing device 11 shown in FIG. 1 in exploded detail.

As shown in FIG. 2 (a), the movable section 13 has a movable plate 23 provided with a hole 22 having an approximately rectangular opening in the center. Four corners of the movable plate 23 are provided with guide holes through which the guiding poles 14 pierce, and the movable plate 23 is vertically movable along the guiding poles 14. On the side faces of the movable plate 23 are provided four projections 16 for supporting one end of the springs 17.

Moreover, the base 12 is provided with an indentation 24 having an approximately rectangular opening in the center. An oblong indentation 25 is provided beside the indentation 24. The four corners of the base 12 are provided with the guiding poles 14 so as to project therefrom.

A mainframe 27 of the approximately rectangular distributing section 21 shown in FIG. 2 (b) is firmly fitted into the hole 22, and is supported and attached to the movable plate 23 by a flange 26 extruding sideward on the top of the mainframe 27. The mainframe 27 is formed in a shallow box shape having the top opened, and a plurality of holding ends 28 (384 in this example) projecting downwards are arranged in matrix form (16 columns×24 lines in this example) on the bottom of the mainframe 27.

Moreover, the wound body 19 shown in FIG. 2 (d) on which the container 18 shown in FIG. 2 (c) is stacked, is mounted to firmly fit with the position of the indentation 24 in the base 12. In the microplate-like container 18 shown in FIG. 2 (c), a plurality of wells 20 (384 in this example) are arranged in matrix form (16 columns×24 lines in this example) and in a grid. The respective wells 20 can store solutions containing various samples. The holding ends 28 are arranged so that they can be inserted at once into the wells 20. Furthermore, the wound body 19 shown in FIG. 2 (d) has a plate 29 of an overall approximately rectangular shape. In the top face of the plate 29 is provided a plurality of striations 30 (24 in this example) parallel to the lines and at a spacing for winding the lines of the matrix, and also is provided a plurality of concavities 31 (16 per each line in this example) at the distribution intervals of the column, along the striations 30. The positioning is performed such that, when the movable plate 23 is lowered until the holding ends 28 come into contact with the plate 29, the holding ends 28 are in contact in the respective concavities 31. The plate 29 is wound with the foundation member along the striations 30. Reference symbol 32 denotes a shaft supporting hole for supporting the plate 29 in the sample assembling device, that will be described later. The hole is also provided in the corresponding opposite side face. Reference symbol 33 denotes a catch for detachably attaching, for example a metal rod 37 which movably supports a core 38 that will be described later.

Figure 3:
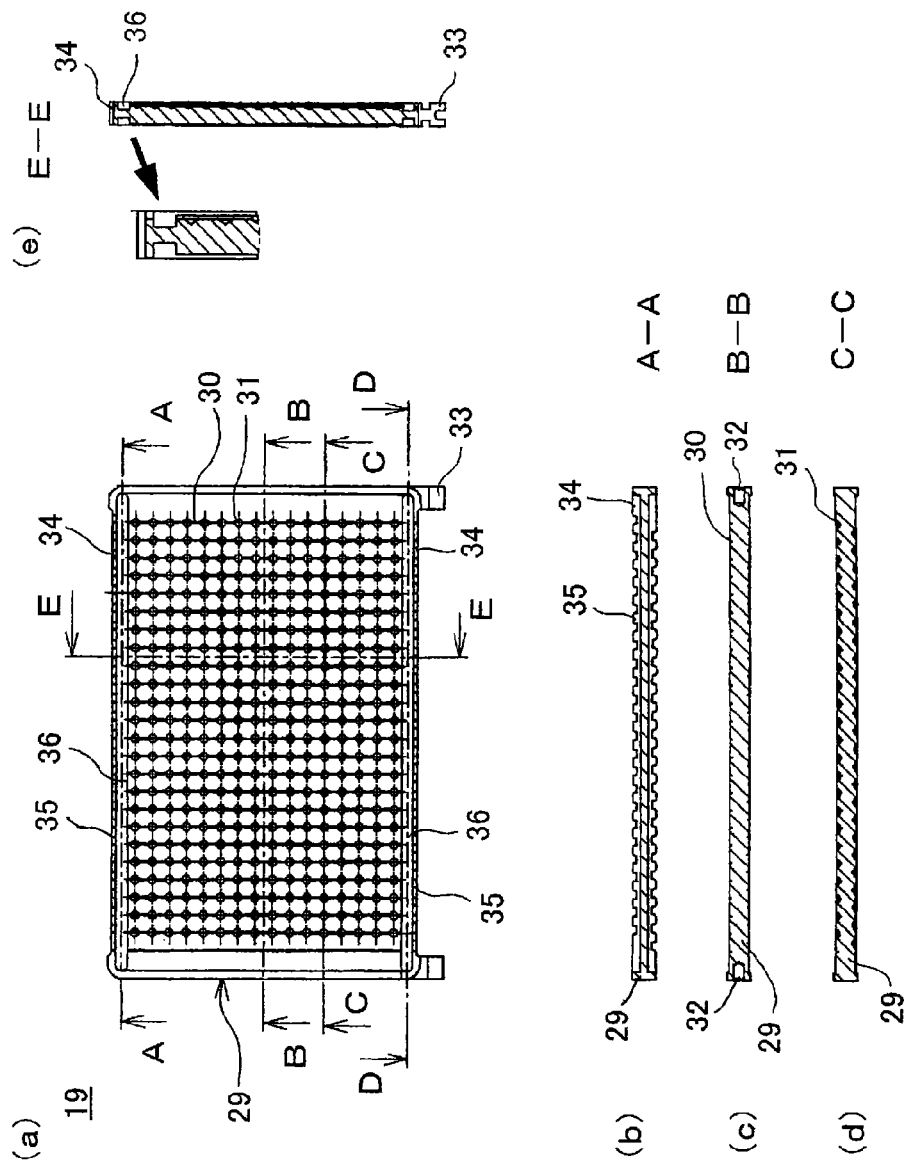
FIG. 3 shows a wound body according to an embodiment of the present invention.

FIG. 3 specifically shows the wound body 19 in more detail. As shown in FIG. 3 (a) or (b), an edge 34 of the plate 29 of the wound body 19 is formed with corrugations, so that the foundation member to be wound can pass over a recess 35. Moreover, as shown in FIG. 3 (a) and (e), a groove 36 is formed on the inside of the edge 34. Since the foundation member is wound around the plate 29, and the foundation member is arranged in parallel with the lines of the matrix on the top face and the reverse face, then as shown in FIG. 3 (b) to FIG. 3 (d), the arrangement position of the foundation member is shifted by half of the pitch between the respective lines, on the top face and the reverse face. For example, in the International Standard 384-well microplate, the pitch (intervals) between the respective wells is 4.5 mm, equal to the winding intervals and the distribution intervals. Therefore the pitches on the top face and the reverse face are shifted by 2.25 mm.

Figure 4:
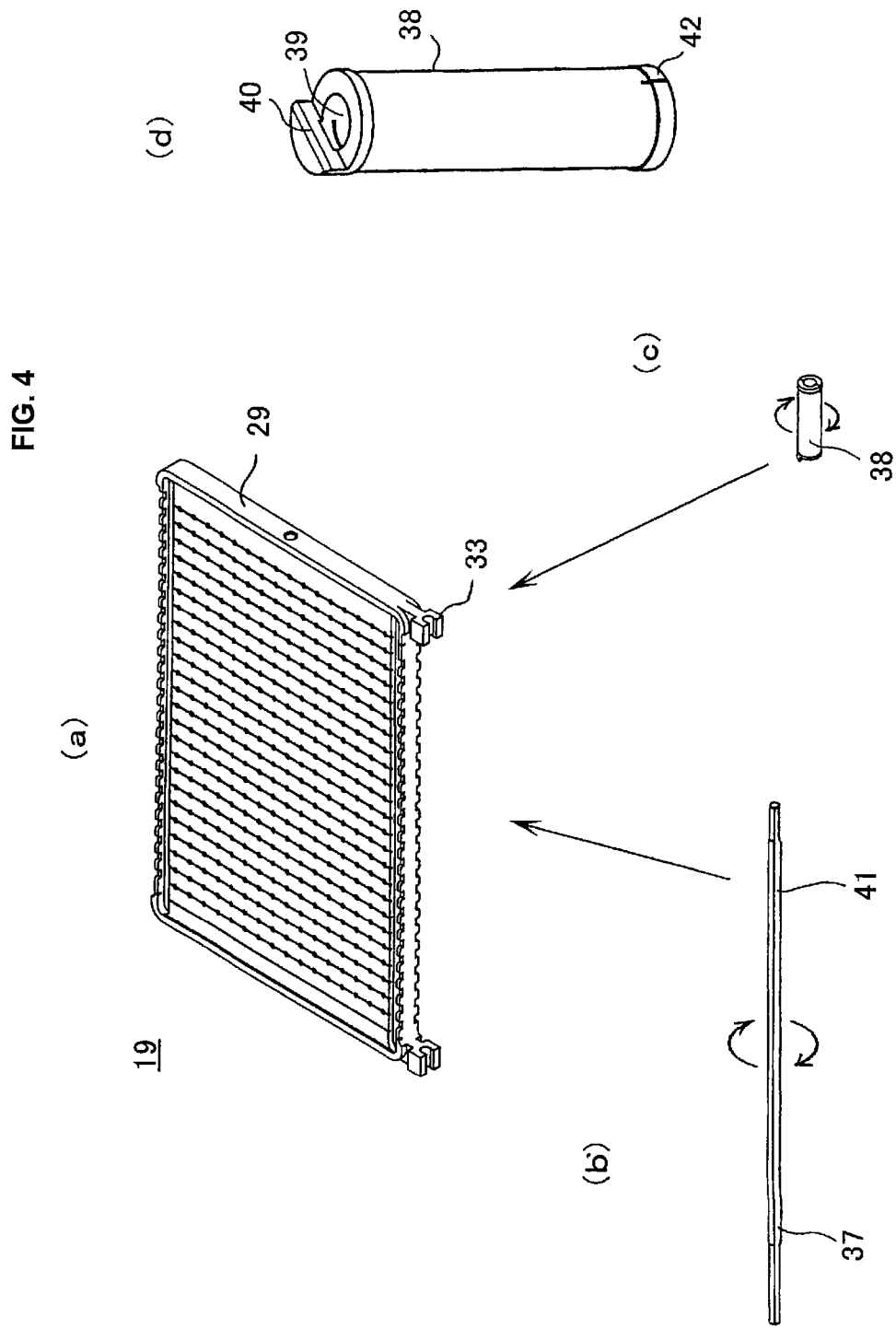
FIG. 4 shows the wound body, a rod, and a core according to the embodiment of the present invention.

FIG. 4 shows a metal rod 37 to be detachably attached to the catches 33 that are provided on the plate 29 of the wound body 19, and a core 38 which is slidably supported onto the rod 37. The core 38 is for assembling the arrangement of the thread-like foundation member by rolling up the thread-like foundation member that is wound around the wound body 19 at the winding intervals of line of the matrix, at narrower intervals than the winding intervals. The core 38 is formed for example from a plastic such as polycarbonate, polyvinyl acetate, polyethylene, polypropylene, polysulphone, polyvinylidene 2 fluoride, teflon (registered trademark) or a metal. The surface of the core 38 is also preferably formed with striations for guiding the winding of the foundation member.

The core 38 is hollow having a cylindrical hole 39 inside. One end thereof is provided with a stopper 40 so as to cover a part of the cylindrical hole 39. The rod 37 is in a cylindrical shape having a diameter capable of passing through the cylindrical hole 39, and has a side face 41 made by cutting off a part of the cylinder by a plane along the axis. Rotation of the core 38 with respect to the rod 37 is stopped by engagement of the rod 37 with the stopper 40. Therefore, the core 38 is movable and detachable along the rod 37, and the core 38 rotates together with the rotation of the rod 37. Reference symbol 42 denotes a slit for attaching an end portion of the foundation member wound around the wound body 19 to the core 38. In this manner, since the wound body 19, the rod 37, and the core 38 are joined via the foundation member, then they are preferably treated as an integrated body with the rod 37 attached to the catches 33, in a condition with the core 38 fitted to the rod 37.

Using the sample distributing device 11 according to the present embodiment, solutions containing samples to be distributed to the foundation member are stored in the respective wells 20 of the container 18. Moreover, the preparation is performed in the following manner. The thread-like or string-like foundation member serving as an object of the sample distribution is wound around the wound body 19, along the striations 30 in the plate 29. One end of the foundation member is inserted into and attached to the slit 42 of the core 38. The core 38 is fitted to the rod 37 by passing the rod 37 through the cylindrical hole 39 thereof, and is then attached to the catches 33 of the wound body 19. As shown in FIG. 1, the wound body 19 thus assembled is mounted in the indentation 24 in the base 12, so that the rod 37 having the core 38 fitted thereon is positioned in the indentation 25. The container 18 is stacked thereon. Next, the distributing section 21 is firmly fitted and attached into the hole 22 of the movable plate 23.

Next, in order to move the movable plate 23 downward, a user lowers the movable plate 23 by applying a force from above the movable plate 23, so that the respective holding ends 28 are inserted into the respective wells 20 of the container 18 so as to come into contact with the stored solutions. When it is confirmed that the respective holding ends 28 are in contact with the solutions, the user releases the force that has been applied to the movable plate 23, to thereby move the movable plate 23 upwards by the elastic force of the springs 17, and return it to the upper position that is the normal condition where no force is applied.

Next, the user removes the container 18 that has been mounted on the wound body 19 from the wound body 19. In the condition where the wound body 19 only is mounted on the base 12, in order to move the movable plate 23 downward again, the user lowers the movable plate 23 by applying a force from above the movable plate 23 until the respective holding ends 28 come into contact with the respective concavities 31 provided in the top face of the plate 29 of the wound body 19 having the foundation member wound therearound. When it is confirmed that the respective holding ends 28 are in contact with the foundation member, the user release the force that has been applied to the movable plate 23, to thereby move the movable plate 23 upward by the elastic force of the springs 17, and return it to the upper position that is the normal condition where no force is applied.

Next, the user turns the wound body 19 upside down. At this time, it is turned around so that the rod 37 attached to the wound body 19 is positioned in the indentation 25 of the base 12. By so doing, the position of the foundation member on the reverse face becomes the same as that of the top face. Samples can be distributed in the reverse face too, by the procedure as described for the top face. Regarding the contents of the container 18, if different samples from the samples for the top face are used, the distributing section 21 and the container 18 need to be replaced by other ones. Moreover, the distributing section 21 can be reused by washing the respective holding ends 28.

Figure 5:
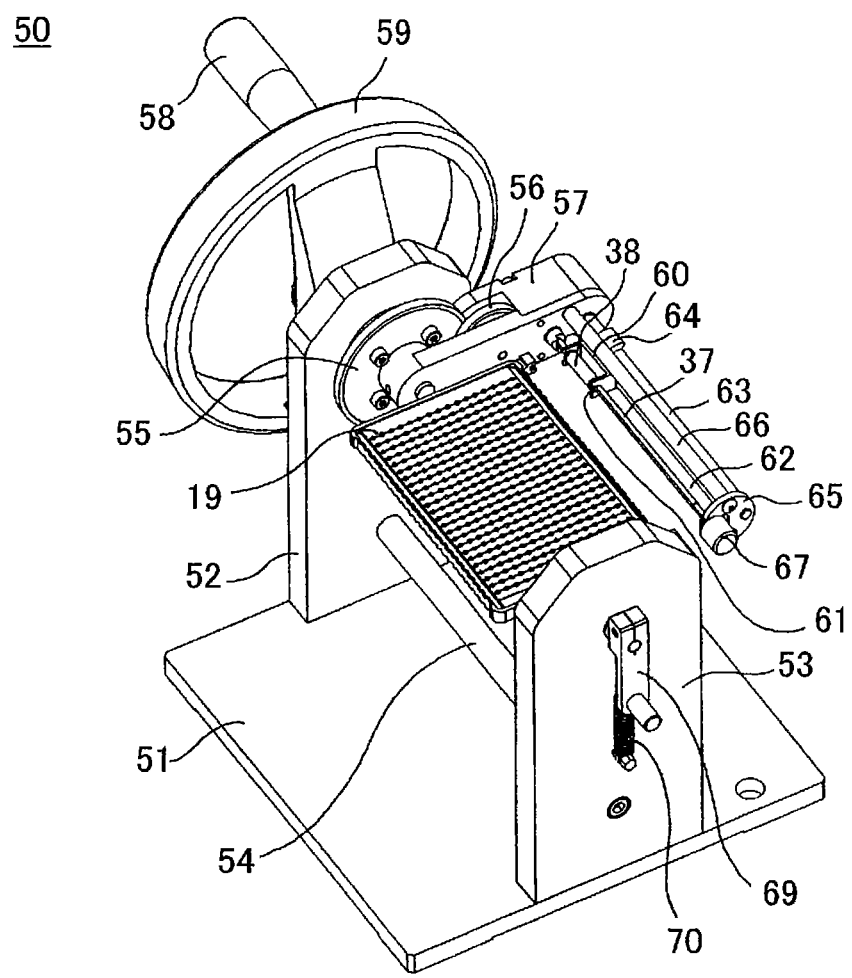
FIG. 5 is a perspective view showing a sample assembling device according to an embodiment of the present invention.

The sample assembling device 50 according to the present embodiment as shown in FIG. 5 is described, for the case where the array of the foundation member is assembled by taking off the foundation member from the wound body that has been wound with the foundation member on which the respective samples have been distributed or immobilized in this manner, and rolling it up around the core 38.

The sample assembling device 50 according to the present embodiment has a horizontal board 51, two vertical boards 52 and 53 which are fixed to the horizontal board 51 being attached in parallel with each other, and a horizontal bar 54 which is spanned so as to connect between the vertical board 52 and the vertical board 53 for reinforcement.

The vertical board 52 is provided with a sun gear 55 secured by screws. An arm section 57 which rotatably supports a planetary gear 56 that revolves around the sun gear 55 while meshing with the sun gear 55, has a pivot shaft on one end which is concentric with the sun gear 55. The pivot shaft is pivotally supported by the vertical board 52. The pivot shaft of the arm section 57 is concentrically connected via a coupling to a rotation shaft of a handwheel 59 fitted with a handle 58 for manually rotating by a user.

The wound body 19 wound with the foundation member on which the samples have been distributed, is pivotally supported so as to match the central axis of the sun gear 55. At this time, the foundation member on the wound body 19 is wound so as to wrap around the axis of rotation, and so that the winding direction of the foundation member on the respective surfaces becomes orthogonal to the direction of the axis of rotation. On the other hand, the rod 37 is attached so as to be in parallel with the axis of rotation of the wound body 19 and so as to project into the arm section 57. The rod 37 pierces through and holds the core 38 to which is attached one end of the foundation member wound around the wound body 19, and is driven by the planetary gear 56 to rotate the core 38 about the axis of the rod 37.

The core 38 held by the rod 37 is held so as to be sandwiched in the axial direction of the rod, by a core holding member 60. By moving the core holding member 60, the core 38 can be moved along the rod 37. The core holding member 60 is in a cross-sectional reverse C shape, and has an engaging groove 61 which engages with the rod 37. Moreover it is movably attached via a supporting member (reference symbol 68 in FIG. 7) to a guide rail 62 that is provided so as to project from the arm section 57 in parallel with the rod 37. Since the core holding member 60 has a slightly longer length than the height of the core 38 and sandwiches the core 38 along the rod 37 direction, the core 38 is held so as to be rotatable according to the rotation of the rod 37.

The core holding member 60 is engaged with a cross-sectional crescent shaped (or cross-sectional semicircular shaped) nut section 64 orthogonal to the axial direction, which is screwed onto a ball screw 63 which is provided so as to project from the arm section 57 in parallel with the axial direction of the rod 37 (the direction of the lines of the wound body) and is driven to rotate by the planetary gear 56. By translationally moving the nut section 64 by rotation of the ball screw 63, the core holding member 60 which engages with the nut section 64, and consequently the core 38, is pushed by the nut section 64 and moved along the rod 37. The cross-sectional crescent shaped nut section 64 is screwed onto the ball screw 63 so that it is not detached as long as the core holding member 60 which is engaged with the nut section 64 is supported by the guide rail 62 and is engaged with the rod 37.

The ends of the rod 37 and the ball screw 63 on the opposite side to the ends on the side attached to the arm section 57 are rotatably supported by a circular plate 65. The circular plate 65 is detachably lock-screwed onto the strut 66 and the guide rail 62, which each have one end attached to the arm section 57. When the rod 37 holding the core 38 is taken off by removing the circular plate 65, the core holding member 60 no longer engages with the nut section 64, and the crescent shaped nut section 64 can be readily taken off from the ball screw 63. Therefore, it is not necessary to put the nut section 64 back to the original position while screwing it along the ball screw 63, and the initial condition of movement can be quickly restored, thus facilitating handling. Reference symbol 67 denotes a cover which covers the end of the rod 37, and is furnished with a bearing for rotatably supporting the other end of the rod 37.

The vertical board 53 is provided with a handle 69 which manually rotates the shaft for rotatably supporting the wound body 19, to adjust the angle of the wound body 19, and a spring 70 which biases to keep the wound body 19 horizontal in a normal condition where no force is applied.

Figure 6:
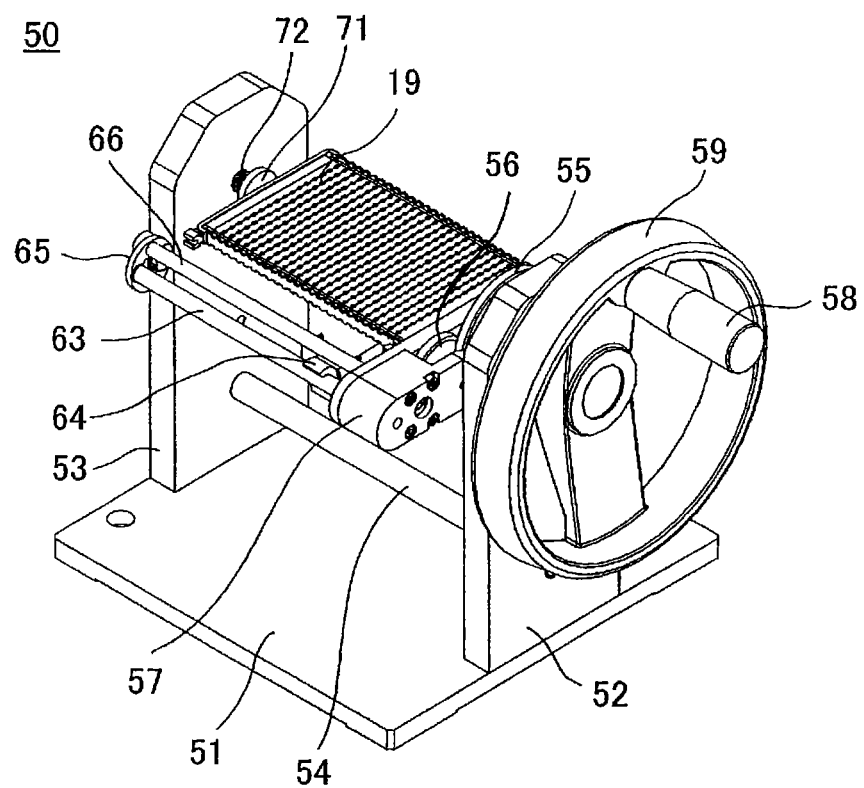
FIG. 6 is a perspective view showing the sample assembling device according to the embodiment of the present invention, viewed from a different direction to that of FIG. 5.

FIG. 6 is a perspective view showing the sample assembling device 50 shown in FIG. 5 from the opposite direction. As shown in FIG. 6, the reverse side of the vertical board 53 has a holding member 71 which swingably holds the wound body 19, and a spring 72 for reliably holding the holding member 71 by pressing in the axial direction.

Figure 7:
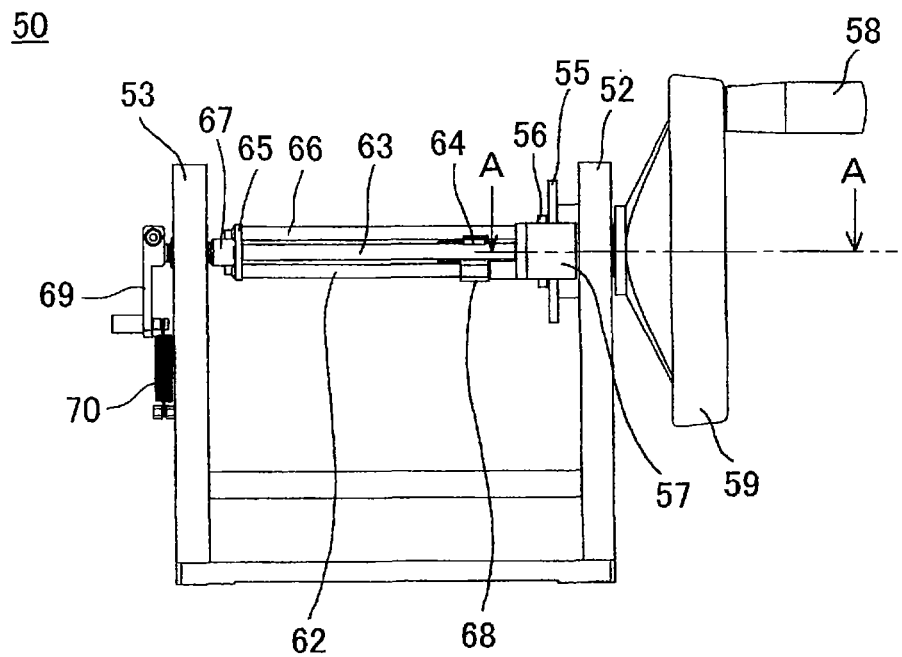
FIG. 7 is a side view of the sample assembling device according to the embodiment of the present invention, and the main part of the mechanism.
Figure 7:
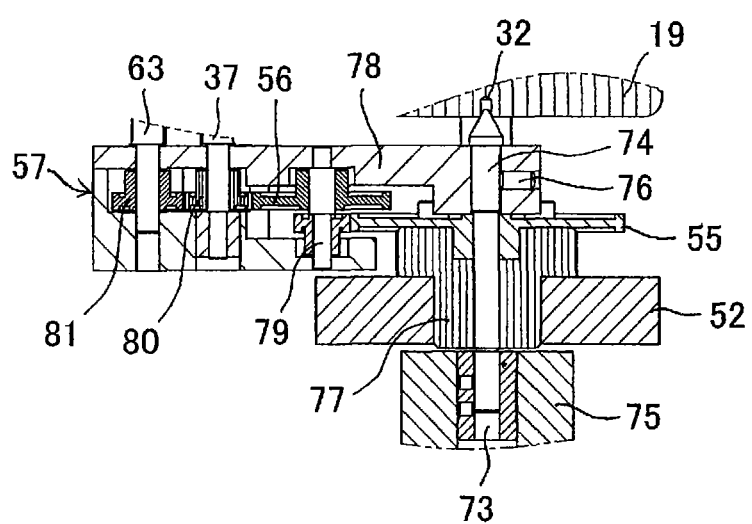

FIG. 7 is for describing in detail the gear mechanism of the sample assembling device 50. FIG. 7 (b) is a cross-sectional view taken along the line A-A of the sample assembling device 50 shown in FIG. 7 (a).

A rotation shaft 73 of the handwheel 59 is connected to a spindle 74 via a coupling 75. The spindle 74 pierces through a hole bored in the center of the fixed member 77 for fixing the sun gear 55 to the vertical board 52 and the sun gear 55, and is fixed at the end of the base body 78 of the arm section 57 by an attaching screw 76. The tip of the spindle 74 is formed in a tapered shape, and pivotally supports the wound body 19 by engaging in a bearing hole 32 of the wound body 19. Consequently, if the handwheel 59 is driven to rotate, only the arm section 57 is rotated.

The arm section 57 is provided with an intermediate gear 79 with a predetermined number of teeth, which meshes with the fixed sun gear 55 having a predetermined number of teeth, in a rotatable manner. Furthermore, the arm section 57 is provided with a planetary gear 56 with a predetermined number of teeth, which is fixed concentrically with the intermediate gear 79, in a rotatable manner. The arm section 57 has a gear 80 for rotating the rod 37, with a predetermined number of teeth, which meshes with the planetary gear 56 and is driven to rotate by the planetary gear 56. Furthermore, the arm section 57 has a gear 81 which meshes with the gear 80 for driving to rotate the ball screw 63.

Here is a specific description of the gear mechanism.

Now, it is assumed that the column directional length of the wound body 19 is 120 mm, the line directional length thereof is 80 mm, the length of the foundation member traversing the thickness portion is 4 mm (the foundation member obliquely traverses the thickness since the winding route of the foundation member is shifted by a half pitch on the top face and the reverse face), and the foundation member where the samples are distributed in a matrix of 16 columns×24 lines is wound along the line direction. Moreover, it is assumed that the winding intervals of line and the distribution intervals of the column are 4.5 mm. It is assumed that, during one rotation of the arm section 57, the core 38 rotates 10 times. As a result, the foundation member for one line wound around the wound body 19 is rolled up. In this case, the length of the foundation member is (80 mm+4 mm)×2=168 mm. Since 168 mm corresponds to 10 times the circumference of the core 38, the diameter of the core 38 becomes 168 mm/10/3.14=5.35 mm. Moreover, in order to set so that the core 38 rotates 10 times during one rotation of the arm section 57, for example, the setting may be such that the sun gear 55 has a number of teeth of 80 Z and a diameter of 48 mm, the intermediate gear 79 which meshes with the sun gear 55 has a number of teeth of 16 Z and a diameter of 12.80 mm, the planetary gear 56 is fixed concentrically with the intermediate gear 79 and has a number of teeth of 40 Z and a diameter of 32 mm, and the gear 80 which meshes with the planetary gear 56 to rotate the core 38 has a number of teeth of 20 Z and a diameter of 16 mm. As a result, the planetary speed reduction ratio becomes (80:16)×(40:20)=10:1, and the core 38 rotates 10 times during one rotation (360 degree) of the arm section 57, while the foundation member for one line is rolled up around the core 38.

Moreover, during ten rotations of the core 38, the core 38 needs to be moved by 1 pitch (=4.5 mm) in the column direction, that is along the rod 37. Now, assuming that the thickness of the foundation member is 0.07 mm, the feed pitch for one rotation of the core 38 by the ball screw 63 is (4.5−0.07×10)/10=0.38 mm. The gear and the ball screw can be selected in the above manner.

In the above case, the effective roll length of the foundation member is 240×5.35×3.14=4033.8 mm (768 spots). In the case where the foundation member is closely rolled up on the core 38, the effective length of the roll portion is 0.07×240=16.8 mm.

Next is a description of an operation where, using the sample assembling device 50, the foundation member that has been wound around the wound body 19 is rolled up around the core 38 so as to assemble the array of the foundation member.

As shown in FIG. 5, the wound body 19 which is wound along the line direction with the foundation member on which the samples are arrayed, is adjusted so that the tip of the spindle 74 is positioned in the bearing hole 32, and is then attached thereinto by pressing by the holding member 71 and the spring 72. At this time, the rod 37 that has been held by piercing through the core 38 attached to the catch 33 of the wound body 19, is taken off, and attached to the arm section 57, and the core 38 is held by being sandwiched by the core holding member 60. Then, the circular plate 65 is attached by lock-screwing into the strut 66 and the guide rail 62. The core 38 is previously attached with one end of the wound foundation member.

The user rotates the arm section 57 by rotating the handwheel 59 in the direction to take off the foundation member from the wound body 19. By so doing, the core 38 revolves around the wound body 19. As a result, the foundation member is sequentially taken off from the wound body 19 one line at a time. At this time, the wound body 19 does not rotate since it is pivotally supported by the spindle at one point.

The core 38 rotates corresponding to the rotation of the rod 37, and rolls up the foundation member that has been taken off from the wound body 19, while being pushed to move in the column direction by being engaged with the nut section 64 which is screwed with the ball screw 63 and moves in the column direction. At this time, regarding the foundation member that has been wound around the pivotally supported wound body 19 and is being taken off, a tension is applied to the foundation member on the edge 35 at the edge of the wound body 19, and so that the foundation member does not become loose, the wound body 19 is brought back to the original condition by the elastic force of the spring 70, or the tension is adjusted manually using the handle 69. In this manner, the wound body 19 swings in the pivotally supported condition. According to the calculation, in the example described above (the case where the length of the wound body is 120 mm in the column and 80 mm in the line direction), the angle of swing with respect to the bearing point of the wound body 19 is 25.16 degree. In the device according to the present embodiment, since the tension is applied to the foundation member on the edge 35 at the edge of the wound body 19, and no sample is distributed on the foundation member positioned in the vicinity of the edge 35, then the distributed samples are not negatively affected by the contact or the tension, and hence reliability is high.

In this manner, the manufactured core 38 is a sample assembly on which the samples are assembled and arrayed in cylindrical form.

Figure 8:
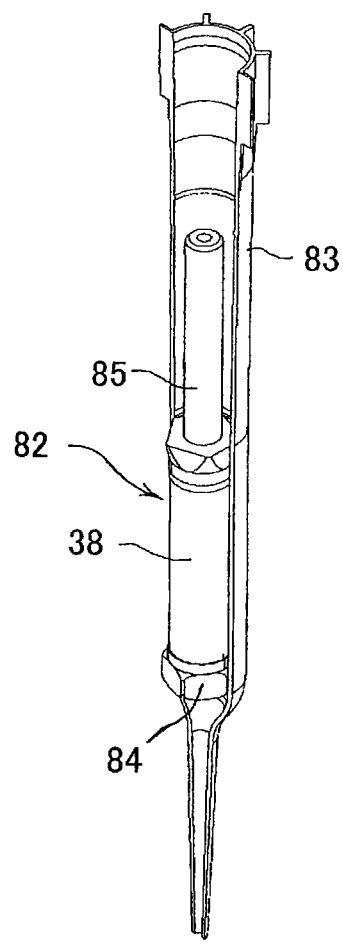
FIG. 8 is a fragmentary broken perspective view showing an example of a sample assembly according to an embodiment of the present invention.

Moreover, as shown in FIG. 8, preferably the handling of the core 38 is facilitated by attaching and fitting a cap 84 for closing the cylindrical hole of the core 38, to the opening on the bottom side of the core 38, and at the top side of the core 38, fitting the bottom end of a stem 85 having a predetermined length for storing in a pipette tip 83, to the opening in the top end of the core 38. As shown in the cut away view of FIG. 8, the core 38 attached with the cap 84 and the stem 85 in this manner, may be stored in the pipette tip 83 as a sample assembly 82 that is used by attaching to a nozzle of a dispenser which can draw and discharge a liquid.

The cap 84 is formed with a gap through which a fluid can pass, between itself and the inner wall of the pipette tip 83, so as to not stop the flow of fluid when the cap 84 is attached to the pipette tip 83. Moreover, the stem 85 is also provided with a gap between itself and the inner wall of the pipette tip 83, so as to not stop the flow of fluid.

Next is a description of a sample arraying/assembling device for manufacturing a sample assembly according to another embodiment, its method, and an apparatus using a sample assembly, with reference to FIG. 9 to FIG. 15.

Figure 9:
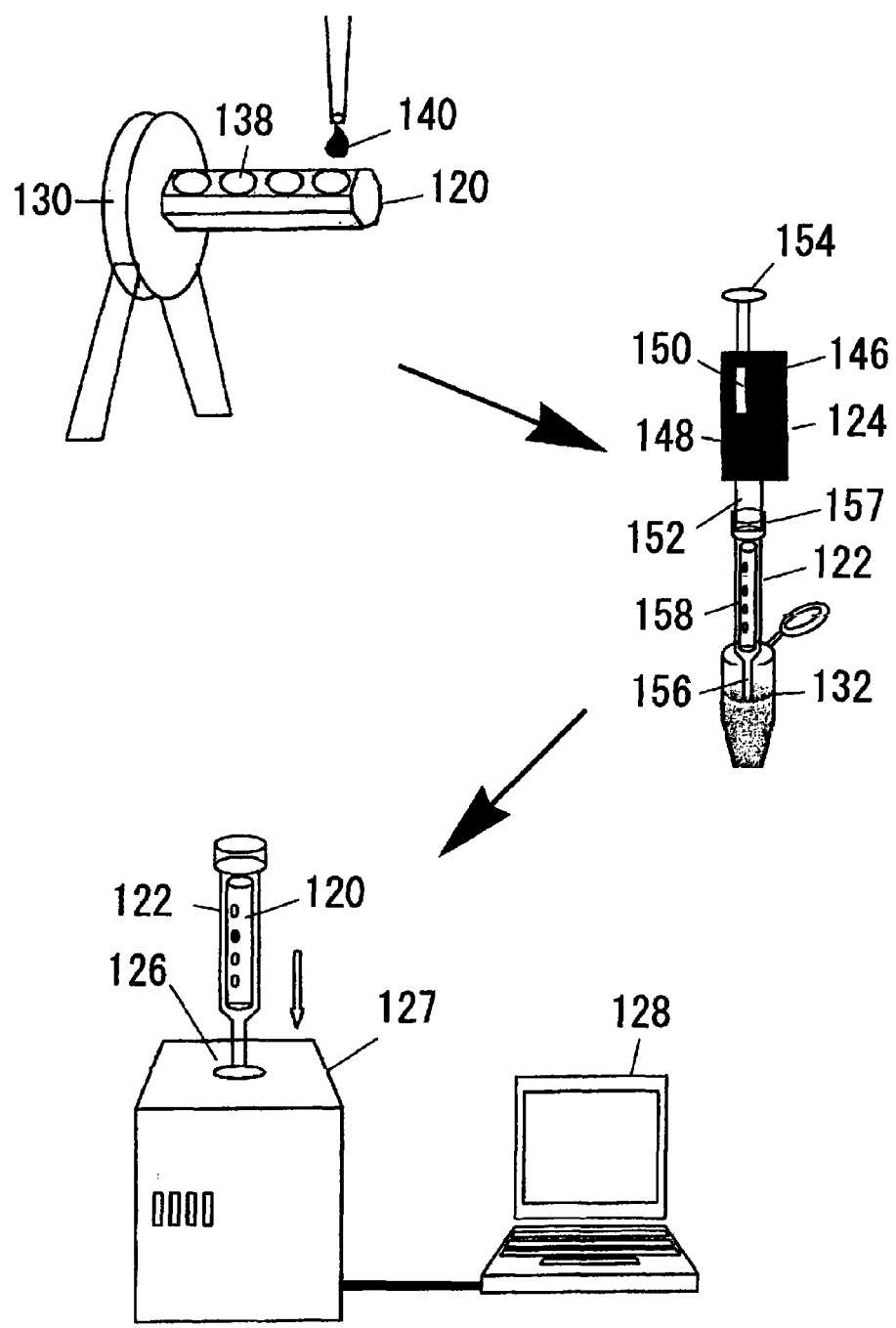
FIG. 9 shows a sample arraying/assembling device according to an embodiment of the present invention, and an apparatus using a sample assembly.

FIG. 9 shows a sample arraying/assembling device according to the embodiment, its method, and an apparatus using a sample assembly.

The sample arraying/assembling device and the apparatus using a sample assembly has a core 120 as a sample assembly or an assembled body, a pipette tip 122, a hand pipetter 124, a scanner device 126 serving as the optical information acquisition section, a controller 127, and a personal computer 128. Moreover, in the examination, a rotating section 130 which is provided on a fixing stage for when adhering and immobilizing the sample for examination to the core 120, and which is manually rotated intermittently at a predetermined angle, and the container 132 in which is stored the solution for performing the reaction with the target biological material, are used.

In this embodiment, the core 120 is an octagonal prism. This is because, by this shape, the sample may be immobilized on the eight flat faces in a rectangular shape formed on the side faces, thus facilitating the immobilization, and also facilitating the positioning when the optical treatment is performed, so that the overall structure of the device can be simplified and the handling can be facilitated. If the core 120 is an octagonal prism, the predetermined angle is suitably 45 degree. In addition, a polygonal prism such as a hexagonal prism or a polygonal tubular body may be employed for the core 120 so as to immobilize the sample on the flat faces formed on the respective surfaces. Moreover it may be in the shape of a column or a cylinder.

As shown in FIG. 9, the core 120 is horizontally attachable (detachable) and concentric with respect to the rotating section 130 which has its rotational axis in the horizontal direction. Moreover, the core 120 is provided with spot marks 138 (mark) in spotting positions where the samples are previously adhered and immobilized. The examiner adheres and immobilizes the sample 140 using the spot marks 138 as an eye-mark. In this manner, by setting the spotting position at the position shown by the spot marks 138, simplification of the device for detecting reaction, and simplification of the processing is achieved.

Moreover, instead of the spot mark 138, concavities for spotting may be provided. Furthermore, spot pieces previously adhered with the samples may be pasted on. The sample may be in a glue form so that the condition of adhesion can be readily recognized by the eye. Moreover, many samples are normally transparent, however samples mixed with coloring matter (non fluorescence or low level of fluorescence) may be used to facilitate confirmation of the adhesion. Alternatively the types of colors may be separated according to the types of the samples.

In this embodiment, for example, four positions for the spot marks 138 are provided in fixed positions in the lengthwise direction of one flat face of the core 120. Since the core 120 is an octagonal prism, if the samples are immobilized on all of the eight faces, 4×8, that is 32 fixed positions can be provided.

Regarding the number of samples 140 to be immobilized on one flat face of the core 120, about four to eight are appropriate considering the simplification of the device. However, any other plural number may be employed. According to the easiness of immobilization of the samples 140, and the necessary number of the samples for immobilization, a form is preferred where the core is octagonal and the number of the samples 140 to be immobilized on one flat face is six (the total number of the samples in this case is 8×6=48).

In this manner, by setting the position of the spot mark and the like as a previously determined fixed position, only the fixed position need be measured at the time of analysis. Therefore the processing can be simply performed, so that simplification of the processing can be achieved. For the material of the core 120, a molding of plastic such as nylon, polycarbonate, polyvinyl acetate, and polyethylene is used. An elastic nylon is preferred from the viewpoint of easiness of production or easiness of sample adhesion.

Figure 10:
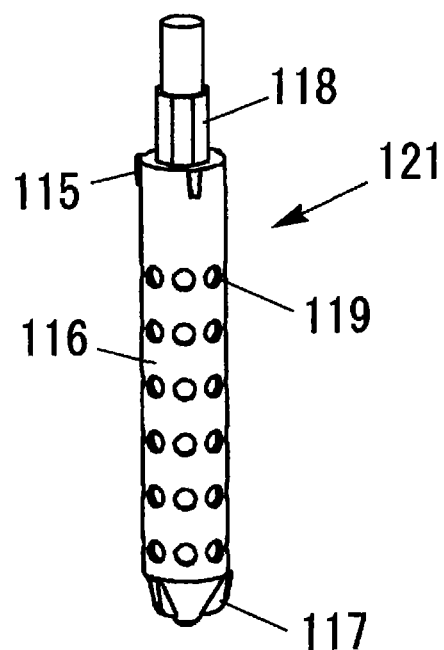
FIG. 10 shows a core according to another embodiment of the present invention.

FIG. 10 shows a core 121 according to another embodiment of the present invention. The mainframe 116 of the core 121 is formed in a cylindrical shape. At the bottom of a part projecting upward from the mainframe 116 is formed an octagonal holder 118. On the surface of the mainframe 116 corresponding to each face of the octagon of the holder 118 is provided six concavities 119 for adhering and immobilizing the samples 140 in predetermined fixed positions in the axial direction.

By the concavities 119, adherence 8 of the samples 140 can be accurately and readily achieved. Instead of the concavities 119, spot marks or pieces containing the samples may be pasted on. The positioning of the holder 118 with respect to the holding member 170 can be accurately and readily performed, by providing an octagonal hole in the holding member 170 of the rotating section 131 which is provided on a later mentioned fixing stage and is intermittently rotatable by hand for each predetermined angle, and inserting the holder 118 thereinto to connect. In this case, the predetermined angle is 45 degree.

Moreover, the top of the mainframe 116 of the core 121 is provided with convex portions 115 at three positions around the circumference. The bottom of the mainframe 116 is formed in a conical taper, and on this part is formed a plurality of blades 117 which project axially and outwards. When the core 121 is inserted into the pipette tip 122, the respective convex portions 115 come into contact with a large diameter portion 158, and the gap clearance between the core 121 and the large diameter portion 158 becomes even. Therefore the reactivity with the solution is improved, and the required amount of solution for the drawing and discharging may be smaller. Moreover, due to the blades 117, foaming of the solution can be prevented at the time of drawing and discharging. Moreover break up of the solution (water break) is improved, thus improving the efficiency of processing.

Figure 11:
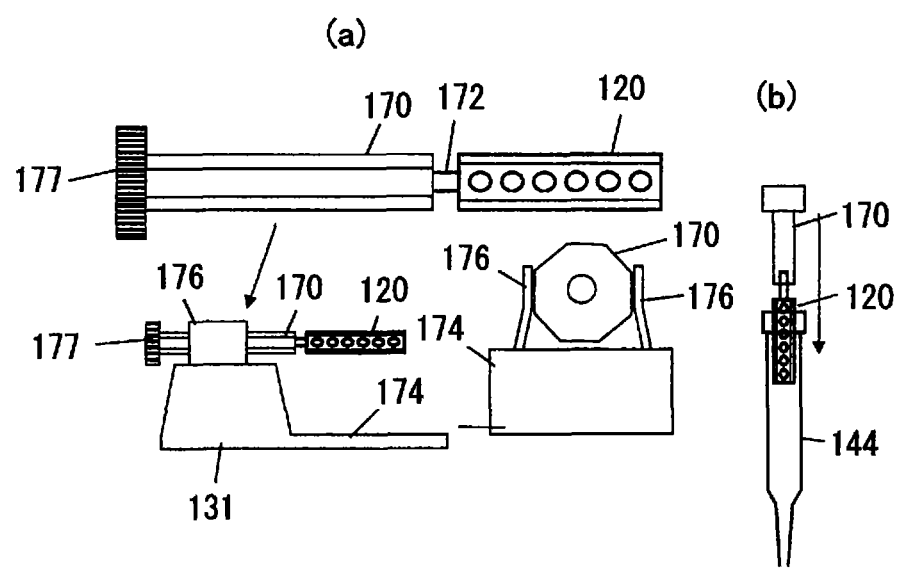
FIG. 11 relates to the embodiment of the present invention, wherein (a) shows a fixing stage, and (b) shows a condition where the core is inserted into a pipette tip.

FIG. 11 (*a*) shows a condition where the core 120 in an octagonal prism shape, is attached to the rotating section 131 provided on a fixing stage in another embodiment. When the samples 140 are adhered, the core 120 is attached to the tip of the octagonal prism shaped holding member 170 via a connecting member 172. In the rotating section 131, spring-plates 176 are fixed to face each other on a pedestal 174, and the bias force of these spring-plates 176 is used to pinch the holding member 170 to hold. The positioning of the core 120 becomes possible by turning a handle 177 provided at the end of the holding member 170. Moreover, as shown in FIG. 11 (*b*), it is possible to store the core 120 attached to the holding member 170 into the pipette tip 122 described below as it is, and it is detached from the holding member 170 after being stored.

As shown in FIG. 9, the hand pipetter 124 has a pipette tip 122 serving as a storage section for the core 120, and a drawing and discharging section 146 for drawing and discharging with respect to the pipette tip 122. The drawing and discharging section 146 is provided with a cylinder 148, a piston 150, and a nozzle portion 152 which is communicated with the cylinder 148 through a pipe. The examiner operates the handle 154 connected to the piston 150 to perform drawing and discharging by the pipette tip 122.

The pipette tip 122 has: an attachment portion 157 which is detachably attached to the nozzle portion 152 via an O-ring or the like; a small diameter portion 156 which has one inlet-outlet at the tip, enabling insertion of the hand pipetter 124 into an external container 132; and a large diameter portion 158 which is provided between the small diameter portion 156 and the attachment portion 157, and has a larger diameter than the small diameter portion 156, for storing the core 120. The opening of the attachment portion 157 becomes a storing port for inserting and storing the core 120.

Figure 12:
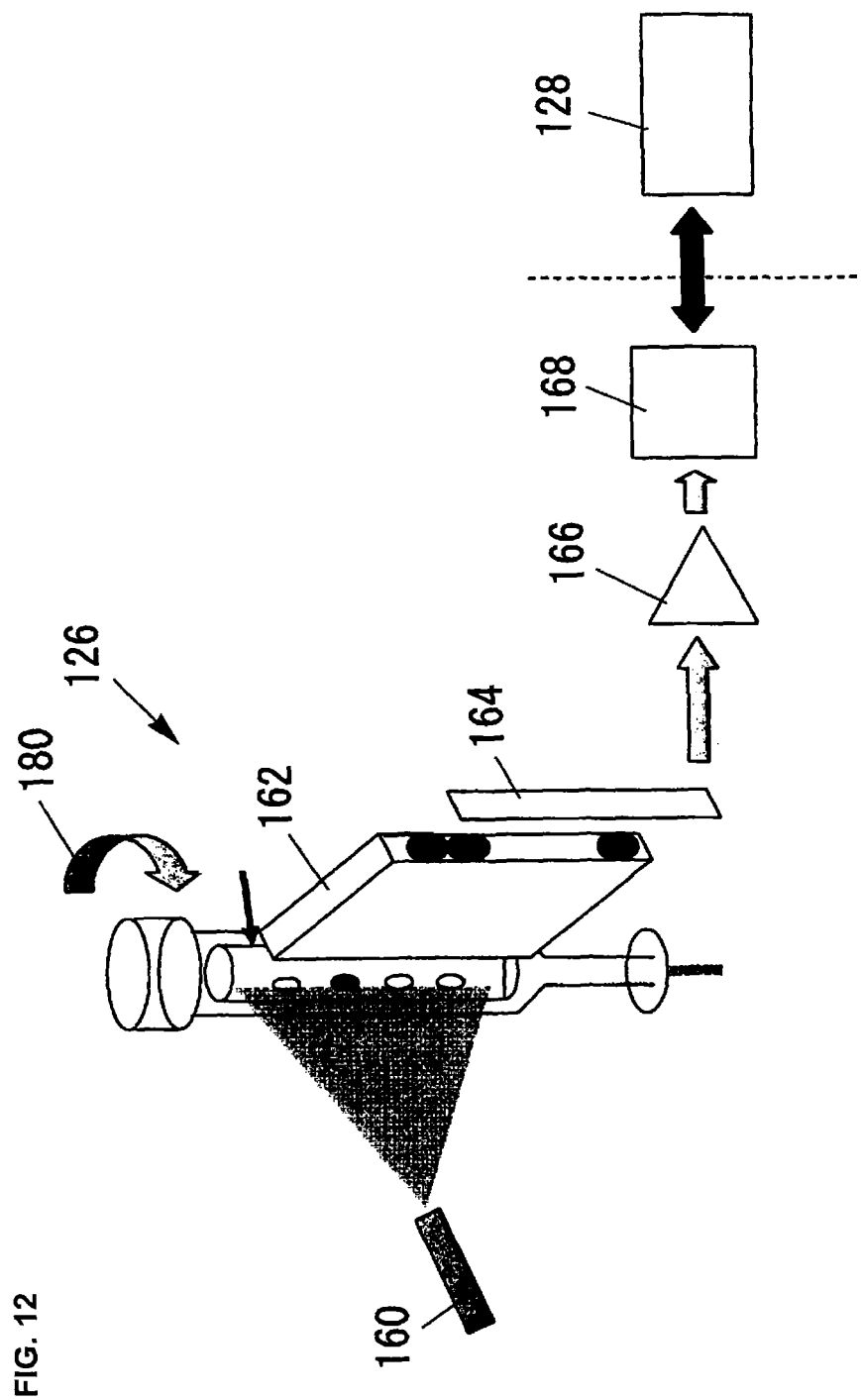
FIG. 12 shows an outline of a scanner device according to an embodiment of the present invention.

As shown in FIG. 12, the scanner device 126 has: a rotating mechanism 180 corresponding to the rotating section, for positioning; a semiconductor laser 160 serving as the optical information acquisition section, as an exciting light source; a microlens array 162; a line CCD 164; and a CPU 168 serving as the controller 127 installed with an A/D converter 166 and a microcomputer. The semiconductor laser 160 is for irradiating exciting light onto the core 120 stored in the pipette tip 122, and it irradiates the core 120 in the axial direction.

Figure 13:
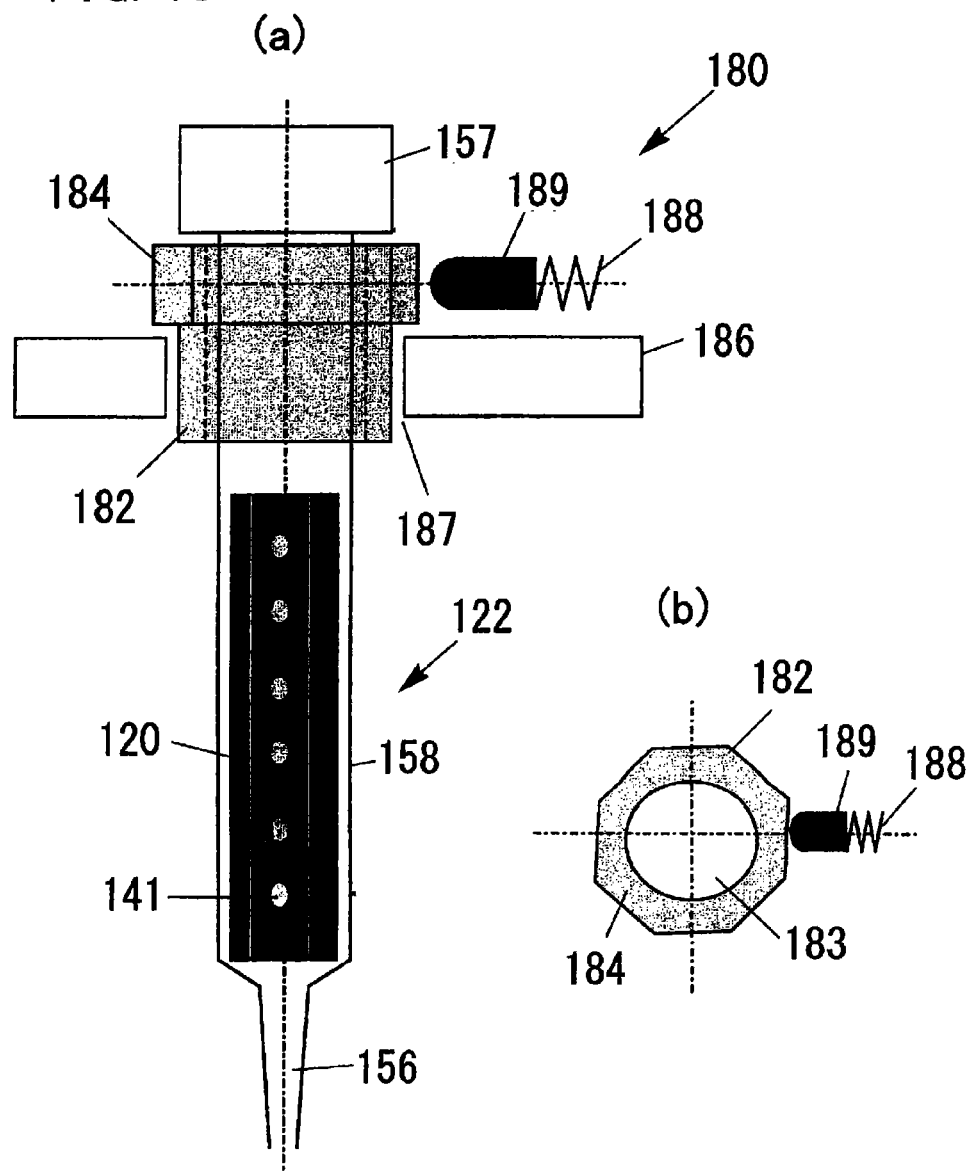
FIG. 13 relates to the embodiment of the present invention, wherein (a) is a front view of a positioning device, and (b) is a plan view thereof.

The rotating mechanism 180 is a mechanism which performs positioning for scanning the periphery of the core 120 stored in the pipette tip 122. As shown in FIG. 13 (*a*), the rotating mechanism 180 has a positioning flange 182, a holding stage 186, a positioning pressing body 189, and so on.

As shown in FIG. 13 (*b*), the positioning flange 182 is formed in a tubular shape and has a circular bore 183. The periphery on the top side is enlarged and is provided with an octagonal positioning side face 184. Moreover the periphery on the bottom side is formed in a circular shape. The positioning flange 182 is capable of holding the large diameter portion 158 of the pipette tip 122 in a condition fitted into the bore 183.

The positioning side face 184 of the positioning flange 182 is engaged in the bore 187 in the holding stage 186, to hold and fix the pipette tip 122. Moreover, the positioning pressing body 189 is provided in a contact state with the periphery of the positioning side face 184 of the positioning flange 182, and presses the octagonal positioning side face 184 by the bias force of the coiled spring 188. As a result, the pipette tip 122 is positioned in units of 45° (360°/8).

In the rotating mechanism 180, when the attachment portion 157 at the tip end of the pipette tip 122 is rotated by an examiner, the pipette tip 122 can be freely rotated while sliding inside the bore in the octagonal positioning flange 182. By this rotation, it is possible to adjust the direction of the rotation of the pipette tip 122 with respect to the positioning flange 182. Moreover, when the positioning flange 182 is manually rotated, then due to the pressure of the coiled spring 188, the positioning flange 182 is positioned and fixed so that the respective faces of the octagon are positioned orthogonal to the pressing direction of the pressing body 189.

Figure 14:
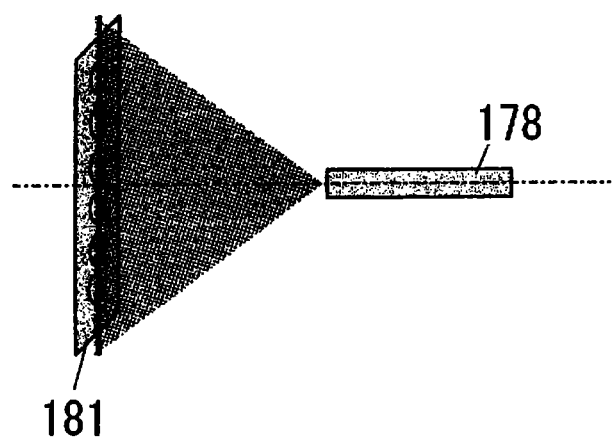
FIG. 14 shows an irradiation mechanism according to the embodiment of the present invention.
Figure 14:
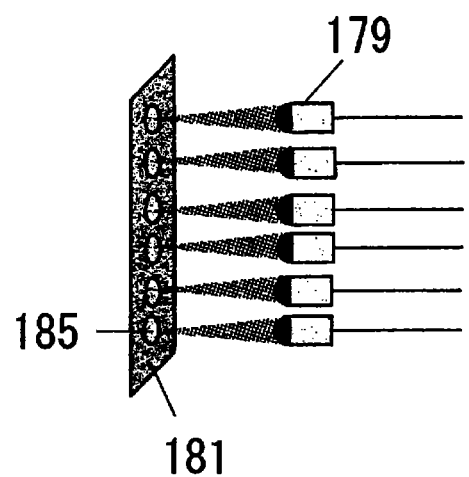

As shown in FIG. 14 (*a*), regarding the form of irradiation from the exciting light source, a semiconductor laser 178 fitted with a line generator capable of linearly diffusing laser beams can be used to diffusion irradiate the detection surface 181. Moreover, as shown in FIG. 14 (*b*), the form may be such that emitters such as high-intensity light-emitting diodes (LED) 179 fitted with condensing lenses according to the number of the detection spots 185 on the detection surface 181, are arranged in one line so as to irradiate at the same time. In this manner, if the light from each light-emitting diode is condensed, the obtained intensity would be equal to that for the case where light of a several mW laser is diffused by a line generator. Moreover the cost is low even if the same number of light-emitting diodes as that of the detection spots 185 are arranged.

The microlens array 162 is for condensing fluorescent light (spot light) emitted from the core 120. Moreover, the line CCD 164 converts the detected spot light into electric signals. The A/D converter 166 is for converting the electric signals into digital signals that can be analyzed by a computer. The CPU 168 has a control function, and converts the image data from the scanner device 126 into digital signals by the A/D converter 166, and sends this image data to the personal computer 128.

Figure 15:
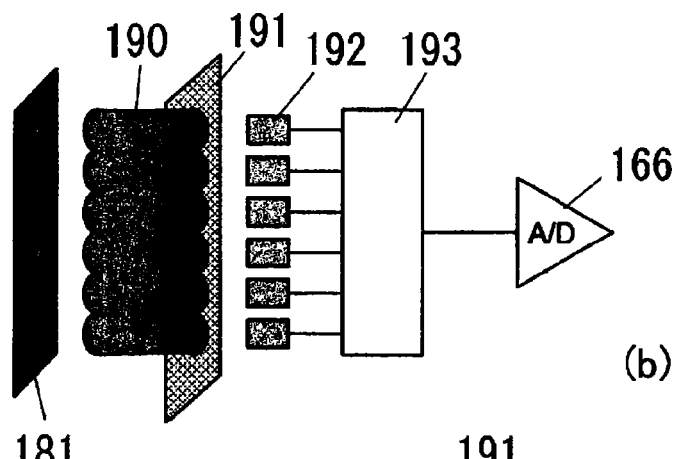
FIG. 15 shows a photodetecting mechanism according to the embodiment of the present invention.
Figure 15:
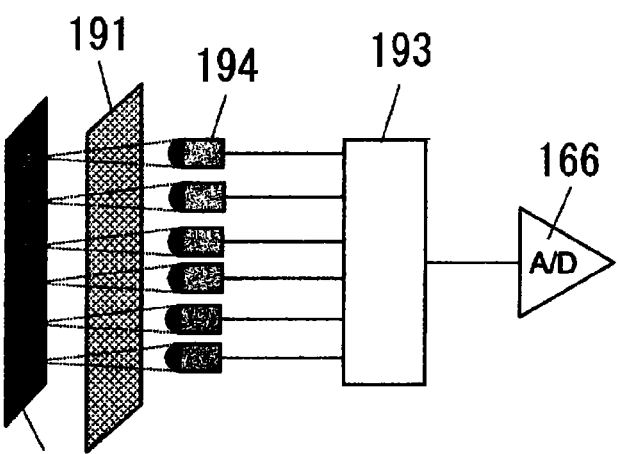
Figure 15:
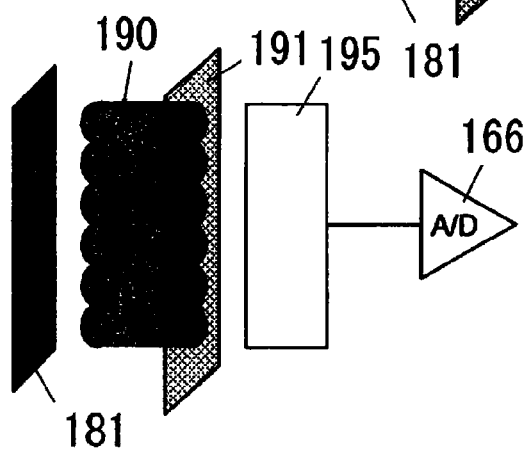

FIG. 15 shows various embodiments of structures where fluorescent light from the detection surface 181 is received and converted into electric signals, which are then converted into digital signals by the A/D converter 166. FIG. 15 (*a*) shows a light receiving and converting structure having; a microlens array 190, an emission filter 191, photodiode arrays 192, an analog multiplexer 193, and an A/D converter 166. This light receiving and converting mechanism is provided with the same number of photodiodes as that of the detection spots 185 on the detection surface 181, and is for selecting electric signals sequentially from the respective photodiodes, by the analog multiplexer 193, and sending them to the A/D converter 166.

FIG. 15 (*b*) shows a light receiving and converting structure having; an emission filter 191, lensed photodiodes 194, an analog multiplexer 193, and an A/D converter 166. The light receiving and converting mechanism is provided with the lensed photodiodes 194 instead of the microlens array 190. Moreover, here the same number of lensed photodiodes 194 as that of the detection spots 185 on the detection surface 181 are arranged one to one, to thereby enable effective detection. FIG. 15 (*c*) shows a light receiving and converting structure having; a microlens array 190, an emission filter 191, a low resolution line CCD 195, and an A/D converter 166. In the light receiving and converting structure, by using the line CCD 195, the degree of freedom of the spotting position and the number can be increased, and the structure can be made at low cost.

Moreover, as shown in FIG. 12, the structure is such that the CPU 168 and the personal computer 128 can be connected by a USB port. Therefore a commercially available personal computer 128 can be used. The personal computer 128 analyzes the image data and displays the recognized results on the display screen, and outputs to a printer.

Here is a description of a procedure for evaluating the storing and reacting using the above device.

First, as shown in FIG. 9, the core 120 is attached and fixed onto the rotating section 130 which is provided so that the rotation axis is horizontal, so as to match the positions of the central axes. The examiner adheres and immobilizes the samples 140 in the positions of the spot marks 138 previously provided on the core 120, using a dropping pipette or the like. There are a plurality of samples 140, which are adhered and immobilized with for example, various oligonucleotides having already-known base sequences. Next, the rotating section 130 is rotated through a predetermined angle, for adhering and immobilizing on the next side face, and this is repeated for the eight side faces. Alternatively, in the case where the rotating section 131 provided on the fixing stage is used for adhering the samples 140 onto the octagonal prism core 120, then as described above, the eight faces on the core 120 are respectively positioned by turning the handle 177 of the holding member 170, and the examiner adheres and immobilizes the samples 140 at the respective fixed positions.

At this time, the adhesion is performed with the respective chemical structures of the samples and the respective fixed positions associated with each other. This standardizes the examination result. Moreover, instead of the samples, a marker using luminescent substances or the like may be adhered and immobilized to the specific position. The marker becomes the standard for specifying the position of the samples, and is set to show the standard strength of the quantitative information. Moreover, if a marker on a specific position is defined to show the initial position, the images can be recognized using the marker as the initial point of the image recognition.

As shown in FIG. 13, a marker 141 showing the standard face may be spotted on the bottom most side (while being stored in the pipette tip) of the core 120. Based on this marker 141, the position having the greatest fluorescence is searched in the free stop condition, and the rotation position of the core 120 in the pipette tip 122 with respect to the positioning flange 182 is positioned in the appropriate position. Then, by intermittently rotating the octagonal positioning flange 182, spots on the other faces can be accurately measured.

When the immobilization onto the one flat face of the core 120 is completed, the core 120 is turned to orient the next flat face, to which position the samples 140 are adhered and fixed. Similarly, the examiner fixes the samples 140 onto the respective flat faces of the eight places (one face, a plurality of faces, or all eight faces).

Next, the examiner stores the core 120 into the pipette tip 122 of the hand pipetter 124. Then, the small diameter portion 156 of the pipette tip 122 is inserted into the container 132, and the solution in the container 132 is drawn until the core 120 is soaked by the drawing and discharging section 146 of the hand pipetter 124, and is then discharged. The operation is repeated for several times. By so doing, DNA in the solution is absorbed onto the samples 140 of the core 120. Next, in a thermostat provided with a Peltier element, a probe solution which is a mixture of the predetermined sample and a liquid suspended with the target material that has been labeled with fluorescent substances and the like, is previously heated at about 95° C., and then cooled down, so as to adjust the solution into a the form to facilitate hybridization.

Furthermore, the small diameter portion 156 of the pipette tip 122 is moved and inserted into the container of the thermostat, and the incubation is performed for about several minutes to several hours to make it react. After the reaction, the small diameter portion 156 is inserted into a container (not shown) in which is stored a cleaning solution at room temperature, and is washed by shaking, to remove the excessive probe solution suspended with the target material and the like.

Then, the washed core 120 is scanned from the outside of the pipette tip 122 using the scanner device 126, and measured. Firstly, the examiner makes the pipette tip 122 storing the core 120, be supported on the positioning flange 182 of the rotating mechanism 180. At this time, the positioning pressing body 189 is directly pressed against the positioning side face 184 of the positioning flange 182, and the positioning is performed by the bias force of the coiled spring 188.

Here, the examiner switches the mode of the scanner device 126 to the monitor mode (spot measurement value is shown in real time). Next, the examiner turns the attachment portion 157 of the pipette tip 122 by hand, to search for the greatest value of the monitor value, and the monitor mode is complete. This position is the optimum angle position for the measurement. After this the optimum positioning can be performed by merely turning the positioning flange 182. At this time, if a marker for specifying the position is used, and in the monitor mode, this marker is made the standard for judging the position where the monitor value becomes greater, then accurate positions can be relatively readily determined. After the positioning, the examiner turns the positioning flange 182 to sequentially position the respective faces of the octagon, and the measurement is started from the first face of the core 120.

Next, when the examiner pushes a measurement button (not shown), the start signal of measurement is notified to the CPU 168 to start the storing and reacting measurement. Then, based on the control of the CPU 168, laser beams are outputted by the semiconductor laser 160 longitudinally along the axial direction of the large diameter portion 158 of the pipette tip 122, irradiating all spots (samples) on one face of the core 120. The laser beams irradiated from the semiconductor laser 160 excite the fluorescent substance.

The fluorescent light (spot light) from the samples of the core 120, generated by the irradiated laser beams, is received through the microlens array 162 onto the line CCD 164, and converted into predetermined electric signals. The electric signals are converted into digital signals through the A/D converter 166. The CPU 68 sequentially sends the signals to the personal computer 128 for each spot.

Next, by rotating the pipette tip 122, each fixed position and the qualitative and quantitative information of the fixed position can be obtained. At this time, there is manual rotation and electric rotation.

As shown in FIG. 13, in the case of manual rotation, the rotation is stopped with a predetermined click feeling for each 45° (360°/8) of the rotation angle, and the octagonal positioning side face 184 is pressed by the bias force of the coiled spring 188, and positioned in a balanced and suitable position. Then, the examiner pushes a measurement button, to inform the start of the measurement to the CPU 168. On receiving the start signal, the CPU 168 operates the semiconductor laser 160 so that the semiconductor laser 160 scans one face of the core 120, and the spot light of the core 120 is received and converted into electric signals, and sent to the personal computer 128. Hereafter the positioning flange 182 is manually rotated intermittently in the same manner, and the spot information of the core 120 is sent to the personal computer 128.

In the case of the electric rotation, after the previous processing, by a command from the CPU 168, a predetermined number of pulses are applied to a pulse motor, to rotate the connected attachment portion 157 of the pipette tip 122 by 45 degrees. A similar operation to the case when the start signal is received, is performed hereafter. The spot light of the core 120 is received and converted into electric signals, and sent to the personal computer 128. Furthermore, pulses are applied to a pulse motor to rotate the connected attachment portion 157, and the spot information of the core 120 is sent to the personal computer 128.

The personal computer 128 assembles the spot information, and analyzes and dissects it as image data, and judges the fluorescent spot light by image recognition. The result is displayed on the display device, and printed by the printer. At this time, since the array, the interval, and the like of the spot can all be comprehended as a fixed value, recognition of the position of the spot light is performed by simple processing. Moreover, when the position is recognized, noise processing becomes unnecessary, and the processing can be performed by a simple judgement for just the presence or absence of the spot light.

Consequently, according to the embodiment, there is an effect of being able to obtain: a sample arraying/assembling device with which the sample can be readily adhered onto a fixed position of the core, the pipette tip can be positioned, light can be irradiated and received with a simple structure, the sample can be measured and the reaction result can be displayed simply at low cost, being economically superior, as well as stable and superior in terms of accuracy; its method; and an apparatus using a sample assembly.

In the above description, the core 120 may be coated with a membrane as the member.

The respective embodiments described above are specific explanations for better understanding of the present invention, and are not to be considered as limiting other embodiments. Consequently, modifications can be made without departing from the scope of the present invention. For example, the number, the size, or the shape of respective members used in the above embodiment, are not limited to these explanations. For example, the number or the arraying method of the containers or the holding ends are not limited to the above case. Moreover, in the description, an example was described in which the core is revolved while rotating around the wound body. However, the invention is not limited to this case, and the case may be such that the wound body is revolved around the core, or that the wound body and the core are revolved about each other. Moreover, at this time, there are cases where the core rotates, where the wound body rotates, and where both rotate.

Moreover, the mechanism such as the gears used for the description is nothing more than one example, and other mechanisms enabling to realize the scope of the invention may be used. Furthermore, the shape of the core is also not limited to a cylindrical shape, and may be in a prism shape.

The shape of the wound body is also not limited to a plate shape, and may be in a prism shape. In this case, samples can be distributed at least on three sides or more, having higher efficiency.

In the above description, the holding ends of the distributing section are inserted into the respective wells of the separately provided container, so as to hold solutions containing the samples. However, the invention is not limited to the above case, and the holding ends themselves may be formed so as to be communicated with the liquid storing sections which store the solution containing the samples. As such an example, holes may be opened in the bottom of the microplate, and the holding ends provided so as to be communicated with the respective wells. As a result, the container and the distributing section can be integrated so as to increase the working efficiency, and the solution containing the same sample can be distributed to a large number of the foundation members.

In the above description, the vertical movement of the distributing section and the rotating of the arm section of the sample assembling device are performed manually. However, a motor may be provided to drive them by the motor.

As an example of the apparatus using a sample assembly, there is only described a sample assembly where the samples are directly arrayed on the core. However, a sample assembly where the string-like foundation member is wound around the core, or a case where a film like member such as a membrane is coated thereon, can be applied.

In the above description, the columns are spaced as the distribution intervals, and the lines are spaced as the winding intervals. However, the opposite may apply. The above respective components, part, devices, and the like such as the foundation member, the wound body, the holding end, the container, the assembled body, the sample assembly, and the optical information acquisition section may be optionally combined while being appropriately modified.

10 . . . sample arraying/assembling device
11 . . . sample distributing device 18 ... container
19 ... wound body
21 ... distributing section
38, 120 ... core
50 ... sample assembling device
82 ... sample assembly
122 ... pipette tip
127 ... controller

What is claimed is:

1. A sample arraying/assembling device comprising:
a distributing section which is capable of holding respective solutions containing samples to be distributed, and which has a plurality of holding ends arranged in a predetermined matrix, the predetermined matrix comprising a first plurality of columns or lines spaced in a parallel relation at predetermined first spacing intervals in a first direction, and a second plurality of columns or lines spaced in a parallel relation at predetermined second spacing intervals in a second direction, the first and second directions being coplanar and mutually different, each of the columns or lines in the second plurality of columns or lines having a first length equal to at least the sum of the predetermined first spacing intervals;
a wound body which has a plane surface wound with a string-like or thread-like slender foundation member formed of a flexible material on which samples are to be distributed in the predetermined matrix, wherein the foundation member is wound on the plane surface at winding intervals equaling the predetermined second spacing intervals, respectively, so that the respective holding ends can come into contact with the foundation member and the samples can be distributed on said foundation member in the predetermined matrix;
a core joined to said wound body by said foundation member, the core having a horizontally-extending axis of rotation and a peripheral curved face or two side faces or more either on which said samples are distributed in predetermined positions with intervals, or being wound or coated with said foundation member on which said samples are distributed at predetermined positions with intervals around said axis of rotation; and
a rotating section which intermittently rotates said core around said axis for each predetermined angle so that said respective samples can be distributed around said peripheral curved face, said respective side faces, or said wound or coated member, in a condition where the axis of said peripheral curved face, respective side faces, or wound or coated member is kept horizontal.

2. A sample arraying/assembling device comprising:
a distributing section which is capable of holding respective solutions containing samples to be distributed, and which has a plurality of holding ends arranged in a predetermined matrix, the predetermined matrix comprising a first plurality of columns or lines spaced in a parallel relation at predetermined first spacing intervals in a first direction, and a second plurality of columns or lines spaced in a parallel relation at predetermined second spacing intervals in a second direction, the first and second directions being coplanar and mutually different, each of the columns or lines in the second plurality of columns or lines having a first length equal to at least the sum of the predetermined first spacing intervals;
a wound body which has a plane surface wound with a string-like or thread-like slender foundation member formed from a flexible material on which samples are to be distributed in the predetermined matrix, wherein the foundation member is wound on the plane surface at winding intervals equaling the predetermined second spacing intervals, respectively, so that the respective holding ends can come into contact with the foundation member and the samples can be distributed on said foundation member in the predetermined matrix;
a core joined to said wound body by said foundation member, the core having an axis of rotation and a peripheral curved face or two side faces or more either on which said samples are distributed in predetermined positions with intervals, or being wound or coated with said foundation member on which said samples are distributed at predetermined positions with intervals around said axis of rotation;
a translucent or semitranslucent pipette tip capable of storing said core and having an axis and a fluid drawing and discharging opening;
a rotating section which intermittently rotates said pipette tip and said core stored in said pipette tip, around the axis of said pipette tip or the core for each predetermined angle; and
an optical information acquisition section which receives light from said core based on the intermittent rotation of said rotating section and obtains optical information.

* * * * *